(12) United States Patent
Di

(10) Patent No.: US 11,557,106 B2
(45) Date of Patent: Jan. 17, 2023

(54) METHOD AND SYSTEM FOR TESTING WEARABLE DEVICE

(71) Applicant: BOE Technology Group Co., Ltd., Beijing (CN)

(72) Inventor: Heliang Di, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 279 days.

(21) Appl. No.: 16/770,095

(22) PCT Filed: Dec. 10, 2018

(86) PCT No.: PCT/CN2018/120057
§ 371 (c)(1),
(2) Date: Jun. 5, 2020

(87) PCT Pub. No.: WO2019/114650
PCT Pub. Date: Jun. 20, 2019

(65) Prior Publication Data
US 2020/0349377 A1 Nov. 5, 2020

(30) Foreign Application Priority Data
Dec. 15, 2017 (CN) .......................... 201711349293.4

(51) Int. Cl.
*G06V 10/24* (2022.01)
*G06F 1/16* (2006.01)
(Continued)

(52) U.S. Cl.
CPC ............ *G06V 10/242* (2022.01); *G06F 1/163* (2013.01); *G06F 3/013* (2013.01); *G06F 3/0416* (2013.01);
(Continued)

(58) Field of Classification Search
USPC ........................................................ 382/289
See application file for complete search history.

(56) References Cited

U.S. PATENT DOCUMENTS 6,496,253 B1 * 12/2002 Vokhmin ........... G01M 11/0264
356/124
2009/0249787 A1 * 10/2009 Pfahl ...................... F24S 50/20
60/641.11
(Continued)

FOREIGN PATENT DOCUMENTS

EP  1061329 A2  12/2000
EP  3128362 A1  2/2017
(Continued)

OTHER PUBLICATIONS

Extended European search report of counterpart EP application No. 18887325.1 dated Jul. 16, 2021.

*Primary Examiner* — Chineyere D Wills-Burns
(74) *Attorney, Agent, or Firm* — Fay Sharpe LLP

(57) ABSTRACT

Disclosed are a method and system for testing a wearable device. The method includes: performing an angle acquisition process for at least two times, and calculating an optical imaging parameter value of a target virtual image on the basis of angle variation values acquired in the at least two angle acquisition processes. With the method and system according to the present disclosure, the finally calculated optical imaging parameter value is more objective and more accurate than that acquired by means of the human eyes.

20 Claims, 19 Drawing Sheets

(51) Int. Cl.

| | |
|---|---|
| *G06F 3/041* | (2006.01) |
| *G06T 7/30* | (2017.01) |
| *G06T 7/73* | (2017.01) |
| *G06T 19/00* | (2011.01) |
| *G01M 11/02* | (2006.01) |
| *G06T 7/80* | (2017.01) |
| *G06F 11/22* | (2006.01) |
| *H04N 17/00* | (2006.01) |
| *G06F 3/01* | (2006.01) |

(52) U.S. Cl.
CPC .................. *G06T 7/30* (2017.01); *G06T 7/73* (2017.01); *G06T 19/006* (2013.01); *G06V 10/243* (2022.01)

(56) References Cited

U.S. PATENT DOCUMENTS

| | | | |
|---|---|---|---|
| 2010/0286571 A1* | 11/2010 | Allum | A61B 5/486 600/595 |
| 2010/0310130 A1* | 12/2010 | Beghuin | G01M 11/0278 382/106 |
| 2014/0210858 A1* | 7/2014 | Kim | G06T 19/006 345/633 |
| 2017/0336284 A1* | 11/2017 | Goldberg | G01M 11/0235 |
| 2017/0358136 A1* | 12/2017 | Collier | G06F 3/013 |
| 2018/0224675 A1* | 8/2018 | Gueu | G01M 11/0228 |
| 2018/0300954 A1* | 10/2018 | Fu | G06T 5/005 |
| 2019/0004325 A1* | 1/2019 | Connor | G02B 27/0172 |
| 2019/0187721 A1* | 6/2019 | Hou | G06T 7/70 |

FOREIGN PATENT DOCUMENTS

| | | |
|---|---|---|
| WO | 2017134275 A1 | 8/2017 |
| WO | 2017201144 A1 | 11/2017 |

* cited by examiner

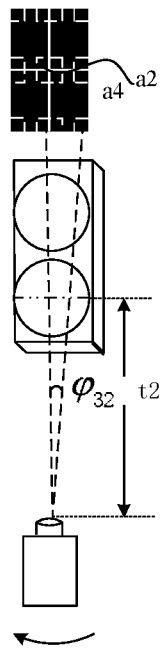
FIG. 14
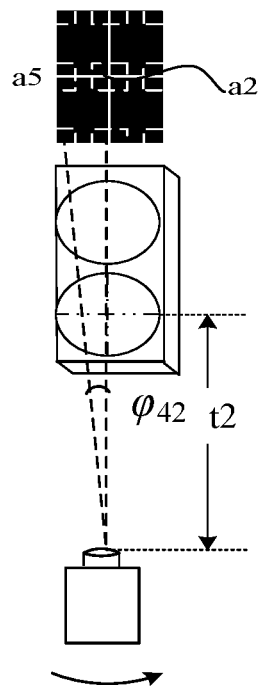

METHOD AND SYSTEM FOR TESTING WEARABLE DEVICE

CROSS-REFERENCE TO RELATED APPLICATION

This application is a 371 of PCT Application No. PCT/CN2018/120057, filed on Dec. 10, 2018, which claims priority to Chinese Patent Application No. 201711349293.4, filed on Dec. 15, 2017 and entitled "A TEST METHOD AND SYSTEM FOR WEARABLE EQUIPMENT", the entire contents of which are incorporated herein by reference.

TECHNICAL FIELD

The present disclosure relates to the field of electronic technologies, and more particularly, relates to a method for testing a wearable device and a system for testing a wearable device.

BACKGROUND

Virtual reality (VR) and augmented reality (AR) technologies are both popular technologies in recent years. In the VR technology, a computer graphics system and various interface devices are utilized to generate an interactive three-dimensional environment (that is, a virtual scene) on a computer and provide immersive feelings for users by this three-dimensional environment. In the AR technology, real-time scenes and virtual scenes can be superimposed in real time to provide users more realistic augmented reality scenes for the users and further enhance the users' immersive feelings. The immersive feeling is a sense of being immersed in an augmented reality scene in the sense of space when a user perceives the augmented reality scene as a real scene.

Wearable devices mounted with the VR technology or the AR technology have a lens component. During use of a wearable device, a user and the display screen are respectively on two sides of the lens component along an optical axis direction, and a target virtual image is formed, via the lens component, by an image displayed on the display screen, and the user can see the target virtual image by the lens component.

SUMMARY

Embodiments of the present disclosure provide a method for testing a wearable device and a system for testing a wearable device. The technical solutions are as follows:

In one aspect, a method for testing a wearable device is provided. The method is applicable to a controller. The method includes:

repeatedly performing an angle acquisition process according to different parameters, the angle acquisition process including:

adjusting a center point of an imaging area of an image acquisition component from a position aligned with an initial point of a target virtual image to a position aligned with a target point of the target virtual image, wherein the target virtual image is a virtual image formed, via a lens component, by an actual test image displayed by a display screen in the wearable device, and a line connecting the center point of the imaging area and the initial point is perpendicular to the display screen when the center point of the imaging area is aligned with the initial point, and acquiring an angle variation value of the center point of the imaging area of the image acquisition component in the adjustment from the position aligned with the initial point of the target virtual image to the position aligned with the target point of the target virtual image; and acquiring an optical imaging parameter value of the target virtual image on the basis of the angle variation values acquired in at least two angle acquisition processes.

Optionally, the test image is rectangular, and the optical imaging parameter value is a virtual image distance of the target virtual image; and repeatedly performing the angle acquisition processes according to the different parameters includes:

respectively performing the angle acquisition process for n times to acquire n first angle variation values, by setting a distance between the image acquisition component and the wearable device as a first capture distance, taking a center point of the target virtual image as the initial point, and taking a center point of n borders of the target virtual image as the target points, $1 \leq n \leq 4$; and respectively performing the angle acquisition process for n times to acquire n second angle variation values, by setting the distance between the image acquisition component and the wearable device as a second capture distance, taking the center point of the target virtual image as the initial point, and taking the center point of the n borders of the target virtual image as the target points.

Optionally, acquiring the optical imaging parameter value of the target virtual image on the basis of the angle variation values acquired in the at least two angle acquisition processes includes:

calculating distance variation values corresponding to n target points on the basis of the n first angle variation values and the n second angle variation values, wherein a distance variation value $d_i$ corresponding to an $i^{th}$ target point satisfies the following equation:

$$d_i = \frac{t1 \times \tan \varphi i1 - t2 \times \tan \varphi i2}{\tan \varphi i1 - \tan \varphi i2},$$

wherein $1 \leq i \leq n$, t1 is the first capture distance, t2 is the second capture distance, $\varphi i1$ is the angle variation value of the center point of the imaging area in the adjustment from the position aligned with the initial point of the target virtual image to the position aligned with the $i^{th}$ target point when the distance between the image acquisition component and the wearable device is the first capture distance, and $\varphi i2$ is the angle variation value of the center point of the imaging area in the adjustment from the position aligned with the initial point of the target virtual image to the position aligned with the $i^{th}$ target point when the distance between the image acquisition component and the wearable device is the second capture distance; and acquiring an absolute value of an average value of the distance variation values corresponding to the n target points as the virtual image distance of the target virtual image.

Optionally, n=4; and the n target points are respectively a center point of a left border of the target virtual image, a center point of a right border of the target virtual image, a center point of an upper border of the target virtual image, and a center point of a lower border of the target virtual image.

Optionally, the display screen displays the test image in full screen, the borders of the test image define a rectangle, and the optical imaging parameter value includes a size of the target virtual image; and repeatedly performing the angle acquisition processes according to the different parameters includes:

taking m different first vertexes of the target virtual image as the initial point, $1 \leq m \leq 4$; and for each first vertex in the m first vertexes, taking two second vertexes adjacent to the first vertex in the target virtual image as the target points and respectively performing two angle acquisition processes to acquire two third angle variation values corresponding to the first vertex.

Optionally, the size of the target virtual image includes a diagonal length of the target virtual image; and acquiring the optical imaging parameter value of the target virtual image on the basis of the angle variation values acquired in the at least two angle acquisition processes includes:

calculating a width and a height of the target virtual image on the basis of 2 m third angle variation values corresponding to the m first vertexes; and calculating the diagonal length of the target virtual image on the basis of the width and the height of the target virtual image.

Optionally, calculating the width and the height of the target virtual image on the basis of 2 m third angle variation values corresponding to the m first vertexes includes:

calculating widths of m target virtual images on the basis of the third angle variation value of which an angle variation direction is parallel to a width direction of the target virtual image in the 2 m third angle variation values;

calculating heights of m target virtual images on the basis of the third angle variation value of which the angle variation direction is parallel to a height direction of the target virtual image in the 2 m third angle variation values;

wherein a width $w_k$ of the target virtual image corresponding to a $k^{th}$ first vertex and a height $h_k$ of the target virtual image corresponding to the $k^{th}$ first vertex satisfy the following equations:

$$w_k = |(t+d) \times \tan \beta_k|,$$

$$h_k = |(t+d) \times \tan \alpha_k|;$$

wherein $1 \leq k \leq m$, d is a virtual image distance of the target virtual image, t is a capture distance of the image acquisition component, $\beta_k$ is the third angle variation value of which the angle variation direction is parallel to the width direction of the target virtual image in the two third angle variation values corresponding to the $k^{th}$ first vertex, $\alpha_k$ is the third angle variation value of which the angle variation direction is parallel to the height direction of the target virtual image in the two third angle variation values corresponding to the $k^{th}$ first vertex;

taking an average value of the widths of the m target virtual images as the width of the target virtual image; and taking an average value of the heights of the m target virtual image as the height of the target virtual image.

Optionally, m=2; and the m first vertexes are located on a same diagonal of the target virtual image.

Optionally, calculating the diagonal length of the target virtual image on the basis of the width and the height of the target virtual image includes:

calculating a diagonal length v of the target virtual image on the basis of a width w and a height h of the target virtual image and a diagonal calculation formula as follows:

$$v = \frac{\sqrt{w^2 + h^2}}{2.54},$$

in unit of inch.

Optionally, the borders of the test image define a rectangle, and the optical imaging parameter value includes a visual angle of the target virtual image; and repeatedly performing the angle acquisition processes according to the different parameters includes:

performing the angle acquisition process for four times to acquire four fourth angle variation values, by taking the center points of the four borders of the target virtual image as the initial points, and taking a border vanishing point of the border on which each initial point is located as the target point of the each initial point.

Optionally, acquiring the optical imaging parameter value of the target virtual image on the basis of the angle variation values acquired in the at least two angle acquisition processes includes:

calculating a horizontal visual angle $\lambda_{horizontal}$ of the target virtual image on the basis of fourth angle variation values $\lambda_{left}$ and $\lambda_{right}$ parallel to the width direction of the target virtual image in the four fourth angle variation values; and calculating a vertical visual angle $\lambda_{horizontal}$ of the target virtual image on the basis of fourth of angle variation values $\lambda_{upper}$ and $\lambda_{lower}$ parallel to the height direction of the target virtual image in the four fourth angle variation values;

wherein the $\lambda_{horizontal}$ and the $\lambda_{vertical}$ respectively satisfy the following equations:

$$\lambda_{horizontal} = \lambda_{left} + \lambda_{right},$$

$$\lambda_{vertical} = \lambda_{upper} + \lambda_{lower}.$$

Optionally, the optical imaging parameter value further includes a distortion amount of the target virtual image; and acquiring the optical imaging parameter value of the target virtual image on the basis of the angle variation values acquired in the at least two angle acquisition processes includes:

acquiring the distortion amount of the target virtual image according to the distance variation values corresponding to four target points, four fifth angle variation values and a third capture distance of the image acquisition component corresponding to the four fifth angle variation values, the fifth angle variation value being the first angle variation value or the second angle variation value.

Optionally, acquiring the distortion amount of the target virtual image according to the distance variation values corresponding to four target points, four fifth angle variation values and the third capture distance of the image acquisition component corresponding to the four fifth angle variation values includes:

calculating a distortion width $w_3$ of the target virtual image on the basis of a third capture distance t3, fifth angle variation values $\theta_{left}$ and $\theta_{right}$ of which an angle variation direction is parallel to the width direction of the target virtual image in the four fifth angle variation values and corresponding distance variation values $d_{left}$ and $d_{right}$;

calculating a distortion height $h_3$ of the target virtual image on the basis of the third capture distance t3, fifth angle variation values $\theta_{upper}$ and $\theta_{lower}$ of which an angle variation direction is parallel to the height direction of the target virtual image in the four fifth angle variation values and corresponding distance variation values $d_{upper}$ and $d_{lower}$;

acquiring a width distortion amount $D_w$ of the target virtual image according to the distortion width $w_3$ and the width of the target virtual image; and acquiring a height distortion amount $D_h$ of the target virtual image according to the distortion height $h_3$ and the height of the target virtual image.

Optionally, the distortion width $w_3$ and the distortion height $h_3$ satisfy the following equations:

$$w_3 = (d_{left} + t3) \times \tan \theta_{left} + (d_{right} + t3) \times \tan \theta_{right},$$

$$h_3 = (d_{upper} + t3) \times \tan \theta_{upper} + (d_{lower} + t3) \times \tan \theta_{lower}.$$

Optionally, acquiring the width distortion amount $D_w$ of the target virtual image according to the distortion width $w_3$ and the width of the target virtual image includes:

calculating absolute values of differences between the distortion width $w_3$ and the respective widths of the target virtual image acquired in p tests to acquire absolute values of p width differences, p being an integer greater than or equal to 1; and acquiring a percentage of an average value of the absolute values of p width differences in the distortion width $w_3$ as the width distortion amount $D_w$ of the target virtual image; and acquiring the height distortion amount $D_h$ of the target virtual image according to the distortion height $h_3$ and the height of the target virtual image includes:

calculating absolute values of differences between the distortion height $h_3$ and the respective heights of the target virtual image acquired in p tests to acquire absolute values of p height differences; and acquiring a percentage of an average value of the absolute values of p height differences in the distortion height $h_3$ as the height distortion amount $D_h$ of the target virtual image.

Optionally, adjusting the center point of the imaging area of the image acquisition component from the position aligned with the initial point of the target virtual image to the position aligned with the target point of the target virtual image includes:

fixing the wearable device and swinging the image acquisition component to adjust the center point of the imaging area from the position aligned with the initial point to the position aligned with the target point; or fixing the image acquisition component and rotating the wearable device to adjust the center point of the imaging area from the position aligned with the initial point to the position aligned with the target point.

Optionally, when the initial point is not the center point of the target virtual image, the angle acquisition process further includes:

before adjusting the center point of the imaging area of the image acquisition component from the position aligned with the initial point of the target virtual image to the position aligned with the target point of the target virtual image, aligning the center point of the imaging area with the center point of the target virtual image, the line connecting the center point of the imaging area and the initial point being perpendicular to the display screen; and translating the center point of the imaging area to the initial point.

Optionally, the test image is a rectangular image with a first color as a base and a second color as a border, wherein two perpendicularly intersected symmetry axes in the second color are displayed on the test image, and the first color is different from the second color.

Optionally, a plurality of alignment boxes in the second color arranged in a matrix are further displayed on the test image, wherein the plurality of alignment boxes include a center alignment box having a common symmetry axis with a rectangular boundary of the test image, and a plurality of edge alignment boxes respectively surrounding at least one of a vertex and a border center point of the test image, and an entire boundary of each edge alignment box is congruent to a part of a boundary of the center alignment box; and a superimposition image is displayed on the image acquired by the image acquisition component, wherein the superimposition image includes a superimposition alignment box in a third color and diagonal lines in the third color of the superimposition alignment box, a boundary shape of the superimposition alignment box is similar to that of the center alignment box, and an intersection of the diagonal lines is the center point of the imaging area.

In another aspect, a system for testing a wearable device is provided. The system includes:

a controller and an image acquisition component;

wherein the controller is configured to:

repeatedly perform an angle acquisition process according to different parameters, the angle acquisition process including:

adjusting a center point of an imaging area of an image acquisition component from a position aligned with an initial point of a target virtual image to a position aligned with a target point of the target virtual image, wherein the target virtual image is a virtual image formed, via a lens component, by an actual test image displayed by a display screen in the wearable device, and a line connecting the center point of the imaging area and the initial point is perpendicular to the display screen when the center point of the imaging area is aligned with the initial point, and acquiring an angle variation value of the center point of the imaging area of the image acquisition component in the adjustment from the position aligned with the initial point of the target virtual image to the position aligned with the target point of the target virtual image; and acquiring an optical imaging parameter value of the target virtual image on the basis of the angle variation values acquired in at least two angle acquisition processes.

The system further includes:

a base, a support post, and a test carrier, wherein one end of the support post is rotatably connected to the base, and the other end of the support post is fixedly connected to the test carrier;

wherein the test carrier is configured to receive the wearable device; and the controller is configured to control the support post to rotate on the base.

Optionally, the system further includes:

a support frame and a rotation structure; wherein one end of the rotation structure is rotatably connected to the support frame, and the other end of the rotation structure is fixedly connected to the image acquisition component; and the controller is configured to control the rotation structure to rotate on the support frame.

Optionally, the rotation structure is a pan and tilt head, and the image acquisition component is a video camera.

Optionally, the wearable device is a virtual reality device, an augmented reality device, or a mixed reality device.

In yet another aspect, a device for use in testing a wearable device is provided. The device includes:

a processor; and a memory for storing at least one executable instruction of the processor;

wherein the processor is configured to execute the at least one executable instruction to perform the method for testing the wearable device as described above.

In still another aspect, a computer-readable storage medium storing at least one instruction therein is provided.

when at least one instruction in the computer-readable storage medium is executed by a processing component, the processing component is enabled to perform the method for testing the wearable device as described above.

BRIEF DESCRIPTION OF THE DRAWINGS

FIG. 14 is another schematic diagram of acquiring a second angle variation value according to an embodiment of the present disclosure;

FIG. 15 is another schematic diagram of acquiring a second angle variation value according to an embodiment of the present disclosure;

DETAILED DESCRIPTION

Figure 1:
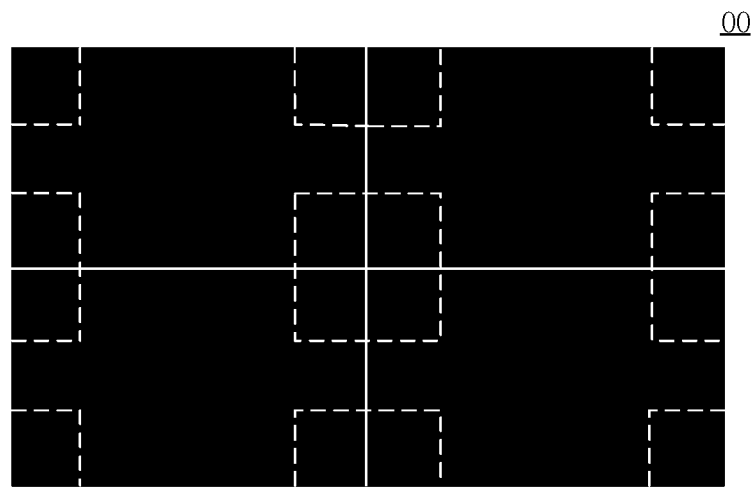
FIG. 1 is a schematic diagram of a test image according to an embodiment of the present disclosure.

The present disclosure is described hereinafter in further detail with reference to the accompanying drawings, to present the objects, technical solutions, and advantages of the present disclosure more clearly.

With the developments of technologies, wearable devices mounted with the VR technology or the AR technology are being more and more widely used. At present, two types of wearable devices are available. One may have its own display screen, and the other may have an accommodation portion for accommodating a terminal with a display screen (such as a mobile phone), wherein the terminal needs to be received in the accommodating portion in use.

The human eyes have a distinct vision distance, that is, objects that are too proximal to the human eyes may not be clearly seen. Therefore, an object generally needs to be placed at a distance greater than 25 cm from the human eyes such that the object may be clearly seen by the human eyes. A display screen of a wearable device (that is, the display screen of the wearable device or the display screen of the terminal accommodated in the wearable device) is usually about 5 cm distal from the human eyes. If a user desires to see clearly the content on the display screen, a lens component (which may be regarded as a magnifier) needs to be placed between the human eyes and the display screen. The lens component includes at least one lens. By the lens component, the human eyes may clearly see the content on the display screen (what is actually seen is a virtual image of the content on the display screen). Therefore, current wearable devices mounted with the VR technology or the AR technology usually have a lens component. During use of a wearable device, a user and the display screen are respectively on two sides of the lens component along an optical axis direction. The image seen by the human eyes is actually a virtual image formed by the lens component according to the image on the display screen. The virtual image is an enlarged image of the image on the display screen. The wearable device may be a virtual reality device, an augmented reality device, or a mixed reality device, such as a smart helmet supporting VR or AR, or smart glasses VR or AR.

At present, when a wearable device displays a virtual image, an optical imaging parameter value of the target virtual image, such as a virtual image distance, is usually estimated by means of watching by the human eyes. This method is relatively subjective and the acquired optical imaging parameter value is less accurate.

In the embodiments of the present disclosure, display performance of the wearable device is tested by analyzing different optical imaging parameters corresponding to a target virtual image (that is, the virtual image formed by the lens component according to a test image displayed on the display screen), and the display performance of the wearable device is optimized and improved according to a test result of the display performance. To ensure the accuracy of the test, a specialized test image may be displayed on the display screen of the wearable device. Optionally, the test image may be a rectangular image with a first color as a base and a second color as a border, two perpendicularly intersected symmetry axes in the second color are displayed on the test image, and the first color and the second color are different. By the test image with two different colors, a relatively high contrast may be achieved to facilitate an effective acquisition of images by the image acquisition component.

For the convenience of tests, two colors with strong contrast therebetween may be selected. For example, the first color is selected as black and the second color is selected as white, or the first color is selected as white and the second color is selected as black.

Optionally, a plurality of alignment boxes in the second color arranged in a matrix may be further displayed on the test image. The plurality of alignment boxes include a center alignment box having a common symmetry axis with the rectangular boundary of the test image (that is, the shape of the center alignment box is an axisymmetric graphic), and a plurality of edge alignment boxes respectively surrounding a vertex and/or a border center point of the test image, and the entire boundary of each edge alignment box is congruent to a part of the boundary of the center alignment box. That is, if each edge alignment box is moved to the position of the center alignment box, the entire boundary of the edge alignment box and a part of the boundary of the center alignment box coincide. In order to make the testing results more accurate, the width of the borders of the multiple alignment boxes may be set as the width of 1 pixel. Correspondingly, the target virtual image (which may be slightly deformed) presented by the lens component according to the test image is visually consistent with the test image, and there are corresponding multiple alignment boxes in the target virtual image. Optionally, the center alignment box is a rectangular alignment box.

As an example, FIG. 1 is a schematic diagram of a test image 00 provided in an exemplary embodiment of the present disclosure. The borders of the test image 00 define a rectangle, that is, the test image has rectangular borders. In FIG. 1, it is assumed that: the first color is black, the second color is white; multiple edge alignment boxes surround vertexes and border center points of the test image respectively. Nine white alignment boxes are displayed on the test image 00, wherein the rectangle alignment box in the center of the test image 00 is a center alignment box. An intersection of the diagonal lines of the center alignment box is the center point of the test image 00, and the center alignment box and the rectangular boundary of the test image 00 have a common symmetry axis. Eight edge alignment boxes are located on the four borders (upper border, lower border, left border, and right border) of the test image 00. The eight edge alignment boxes include four alignment boxes respectively surround the upper left vertex, the lower left vertex, the upper right vertex, and the lower right vertex of the test image 00, and the entire boundary of each of the four alignment boxes is congruent to one-quarter of the boundary of the center alignment box. The eight edge alignment boxes also include four alignment boxes respectively surround the center point of left border, the center point of right border, the center point of upper border and the center point of lower border of the test image 00, and the entire boundary of each of the four alignment boxes is congruent to half the boundary of the center alignment box.

In the embodiment of the present disclosure, a target virtual image presented by the wearable device is acquired by an image acquisition component, and then the optical imaging parameters of the target virtual image are acquired. The image acquisition component may be a head camera, a camera, a video camera and other devices that may capture images.

Optionally, a superimposition image may be displayed on the image acquired by the image acquisition component. The superimposition image may be an image directly output by the image acquisition component, which may be an image directly superimposed on a target virtual image presented by the wearable device during capturing of the target virtual image. For example, the superimposition image may be directly superimposed on the captured target virtual image by the image acquisition component through software processing, or the superimposition image may be directly drew or attached on the lens of the image acquisition component to enable the image acquisition component to output a target virtual image superimposed with the superimposition image after capturing the target virtual image presented by the wearable device. At this time, the image output by the image acquisition component includes both the actually captured image (i.e. the target virtual image) and the superimposition image. For example, if the image acquisition component is a video camera, the image displayed on the display screen of the video camera includes the actual captured image and the superimposition image. Optionally, the superimposition image may also be superimposed on a corresponding image by a processing component in processing the image output by the image acquisition component. For example, when the image acquisition component is a video camera and the processing component is a computer, the image displayed on the display screen of the video camera is the actually captured image, and the image displayed on the display screen of the computer includes the actually captured image and the superimposition image.

The above superimposition image is configured to be superimposed with the target virtual image (that is, the virtual image presented by the lens component according to the test image), and the superimposition image corresponds to the test image. For example, the superimposition image includes a superimposition alignment box in a third color that is similar in shape to the boundary shape of the center alignment box in the test image (that is, the shape of the boundary of the superimposition alignment box and the shape of the center alignment box are similar graphics), and diagonal lines in the third color of the superimposition alignment box, the intersection of the diagonal lines is the center point of the imaging area of the image acquisition component. Correspondingly, in order to facilitate the alignment, the width of the border of the superimposition alignment box of the superimposition image may be set corresponding to the width of the border of the center alignment box in the test image. For example, the width of the border of the superimposition alignment box of the superimposition image may be set as the width of 1 pixel. In practice, the imaging area is the area where the image acquisition component captures images. For example, if the image acquisition component is a video camera or a head camera, the imaging area is the area corresponding to the lens. When the superimposition alignment box is a rectangular alignment box, two mutually perpendicular borders of the superimposition alignment box are respectively parallel to the horizontal direction and vertical direction of the image acquisition component (the horizontal direction and the vertical direction of the image acquisition component may be determined by the internal reference coordinate system of the image acquisition component) to ensure that it is effectively aligned with the target virtual image. Optionally, when the borders of the imaging area define a rectangle, the borders of the superimposition alignment boxes are respectively parallel to the borders of the imaging area. When the imaging area is circular, the symmetry axes of the superimposition alignment boxes are respectively coaxial with the horizontal symmetry axis and the vertical symmetry axis of the imaging area. The superimposition alignment boxes in the superimposition image are configured for superimposing alignment with the alignment boxes of the target virtual image. The tester or the controller may translate the image acquisition component and/or the wearable device to observe the superimposed state between the superimposition alignment boxes of the superimposition image and the alignment boxes of the target virtual image.

In an optional implementation, the boundary size of the superimposition alignment box in the superimposition image may change as the distance between the image acquisition component and the wearable device changes, and the superimposition image may be scaled proportionally to visually coincide the boundary of the scaled superimposition alignment box with the boundary of the center alignment box. Further, the width of the borders of the superimposition alignment box of the superimposition image may also be adjusted to visually and obviously coincide the boundary of the scaled superimposition alignment box with the boundary of the center alignment box, thereby improving visual recognition.

Figure 2:
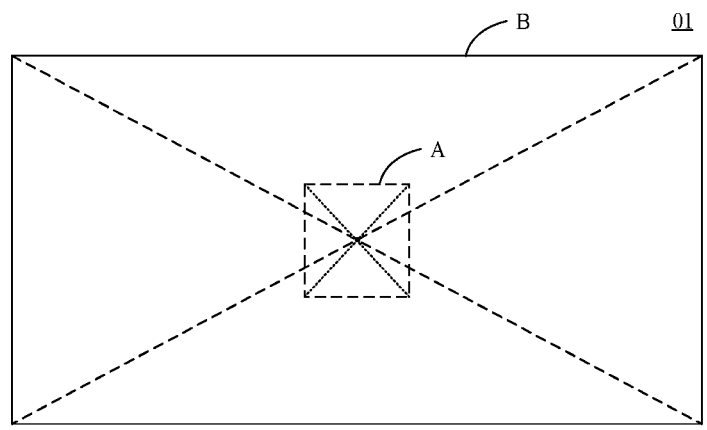
FIG. 2 is a schematic diagram of a superimposition image according to an embodiment of the present disclosure.

An example is shown in FIG. 2, which is a schematic diagram of a superimposition image 01 provided in an illustrative embodiment of the present disclosure. The superimposition image 01 includes at least a superimposition alignment box A and diagonal lines in the superimposition alignment box A. In practice, the superimposition image 01 may further include a rectangular box B surrounding the superimposition alignment box A, and may further include diagonal lines of the rectangular box B. The rectangular box B and the test image may be similar graphics. In FIG. 2, it is assumed that: the superimposition alignment box A is a rectangular alignment box; the background of the superimposition image is transparent; the superimposition alignment box A of the superimposition image is similar in shape to the center alignment box displayed on the test image; the intersection of the diagonal lines of the superimposition alignment box A is the center point of the imaging area; and the two mutually perpendicular borders of the superimposition alignment box A are respectively parallel to the horizontal direction and vertical direction of the image acquisition component.

If the center point of the imaging area needs to be aligned with the center point of the center alignment box on the target virtual image (that is, the center point of the test image), the tester or the controller may slowly translate the image acquisition component and/or the wearable device to align the center point of the superimposition image with the center point of the center alignment box (this process is a coarse adjustment process), and then zoom and/or move the superimposition image to coincide the boundary of the superimposition alignment box and the boundary of the center alignment box displayed on the target virtual image (this process is a fine adjustment process), and finally the center points and the boundaries of both coincide, so that the center point of the imaging area is effectively aligned with the center point of the center alignment box. It is noted that, in order to facilitate the observation of the superimposition state of the boundaries of the superimposition alignment box and the center alignment box, the width of the border of the superimposition alignment box may be set to be equal to or slightly less than the width of the border of the center alignment box. It also should be noted that the above-mentioned slow translation means that the moving speed is less than a specified speed threshold to ensure that no large vibrations are generated during the movement in order to reduce the impact on the measurement accuracy.

Further, assuming that the proportional relationship between the center alignment box of the test image and the rectangular boundary of the test image shown in FIG. 1 is a first proportional relationship, and the proportional relationship between the superimposition alignment box A and the rectangular box B in FIG. 2 is a second proportional relationship, then the first proportional relationship and the second proportional relationship may be equal. In this way, when the superimposition image is zoomed and/or moved to coincide the boundary of the superimposition alignment box and the boundary of the center alignment box displayed on the target virtual image, it is necessary to ensure that the rectangular boundary of the test image and the boundary of the rectangular box B also coincide, such that a center alignment may be achieved more accurately.

If it is necessary to align the center point of the imaging area with the center point surrounded by the edge alignment box on the target virtual image, the tester or the controller may slowly translate the image acquisition component and/or the wearable device to align the center point of the superimposition image with the center point surrounded by the edge alignment box (this process is a coarse adjustment process), and then zoom and/or move the superimposition image to coincide the boundary of the superimposition alignment box and the boundary of the edge alignment box displayed on the target virtual image (this process is a fine adjustment process), and finally the center points and the boundaries of both coincide, such that the center point of the imaging area is effectively aligned with the center point of the edge alignment box.

It is noted that there may be multiple shapes of the above-mentioned center alignment box, such as a circle or a square, as long as the superimposition image and the target image may be effectively aligned. In addition, each line in the test image shown in FIG. 1 and the superimposition image shown in FIG. 2 may be a dotted line or may be a solid line as long as the displayed image is clearly visible, and FIG. 1 and FIG. 2 are only schematic and do not limit the type of the line.

Figure 3:
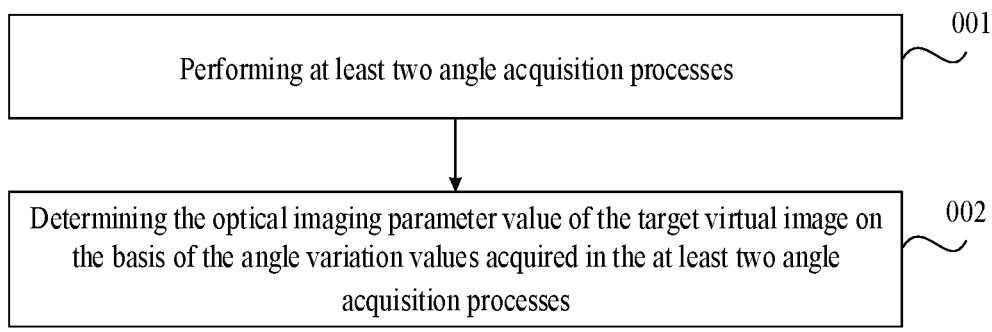
FIG. 3 is a flowchart of a method for testing a wearable device according to an embodiment of the present disclosure.

An embodiment of the present disclosure provides a method for testing a wearable device, wherein a display screen displays a test image, and optionally, the display screen generally displays a test image on the full screen. This method may be used to test the optical imaging parameter values of the wearable device, and may be performed by a controller. The method includes the following steps as shown in FIG. 3.

In step 001, an angle acquisition process is repeatedly performed according to different parameters.

The angle acquisition process includes the following step:

In step S1, a center point of an imaging area of an image acquisition component is adjusted from a position aligned with an initial point of a target virtual image to a position aligned with a target point of the target virtual image, wherein the target virtual image is a virtual image of an actual test image displayed by a display screen in the wearable device.

Optionally, step S1 includes the following step.

In step S11, the center point of the imaging area of the image acquisition component is aligned with the initial point of the target virtual image.

In the embodiment of the present disclosure, the line connecting the center point of the imaging area and the initial point is perpendicular to the display screen (that is, parallel to the axis of the lens component) when the center point of the imaging area is aligned with the initial point, to ensure that the plane where the imaging area is located is parallel to the plane where the display screen is located.

For example, still referring to the test image shown in FIG. 1, according to the optical imaging parameter value to be acquired of the target virtual image, the initial point may be the center point of the test image, or the upper left vertex, lower left vertex, the upper right vertex or the lower right vertex of the test image, or the center point of the left border, the center point of the right border, the center point of the upper border or the center point of the lower border of the test image. In an optional implementation, in order to ensure that the line connecting the center point of the imaging area and the initial point is perpendicular to the display screen when the center point of the imaging area is aligned with the initial point, the image acquisition component and/or the wearable device may be moved to adjust the relative position of the center point of the imaging area and the initial point of the target virtual image. When the center and boundary of the superimposition alignment box of the superimposition image displayed on the imaging area coincide with the center and boundary of the alignment box where the initial point in the target virtual image is located, the center point is also aligned with the initial point.

Due to the structure of the lens component or other reasons, there may be problems such as distortion of the target virtual image formed by the lens according to the test image. This distortion usually occurs at the edge of the image (that is, the target virtual image). Therefore, when the initial point of the target virtual image is not the center point of the target virtual image (for example, the initial point is located at the edge of the target virtual image), because ripples or warps are generated at the edge of the target virtual image due to the distortion in the target virtual image formed by the lens component according to the edge of the test image, an alignment deviation is easy to occur when the center point of the imaging area is aligned with the point with distortion, and effective measurement results of optical imaging parameters may not be acquired, which affects the accuracy of the measurement method.

Therefore, in order to ensure the accuracy of the alignment between the center point of the imaging area and the initial point of the target virtual image, when the initial point is not the center point of the target virtual image, the tester may firstly align the center point of the imaging area with the center point of the target virtual image, and the line connecting the center point of the imaging area and the initial point is perpendicular to the display screen. The tester further translates the center point of the imaging area to the initial point, and this translation process refers to a movement without changing the distance between the central point of the imaging area and the display screen, that is, a movement within a plane parallel to the display screen. In an optional implementation, the controller controls the image acquisition component and the wearable device to move relative to each other, such that the center point of the imaging area and the center point of the virtual image are translated to the initial point. Optionally, during relative movement between the image acquisition component and the wearable device, the test observes (or the controller detects) the superimposition state between the superimposition alignment box where the center point of the imaging area is located and the edge alignment box of the target image where the initial point is located, and finally, when the two coincide, it may be considered that the center point of the imaging area is aligned with the initial point of the target virtual image.

It is noted that, the relative movement between the image acquisition component and the wearable device may be practiced by slowing translating the image acquisition component and/or slowing translating the wearable device. In the embodiment of the present disclosure, the slow translation means that the movement speed is less than a preset speed threshold, and the movement trajectory is in a plane parallel to the display screen in the wearable device.

In step S12, the image acquisition component and the wearable device are relatively rotated, such that the center point of the imaging area of the image acquisition component is changed from a position aligned with the initial point of the target virtual image to a position aligned with the target point of the target virtual image.

Figure 4:
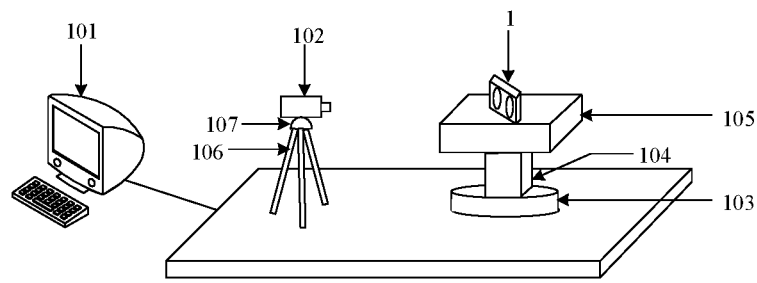
FIG. 4 is a schematic structural diagram of a device for use in testing a wearable device according to an embodiment of the present disclosure.

Optionally, the present disclosure provides a system for testing a wearable device, wherein the system is configured to implement the adjustment of the image acquisition component and the wearable device in step S12. The system may implement other process in which the image acquisition component and/or the wearable device need to be moved. As shown in FIG. 4, the system may include a controller 101, an image acquisition component 102, a base 103, a support post 104, a test carrier 105, a support frame 106, and a rotation structure 107. The base 103, the support post 104, and the test carrier 105 may be referred to as a first a combined structure, and the controller may move the wearable device by controlling the first combined structure. The support frame 106, and the rotation structure 107 may be referred to as a second combined structure, and the controller may move the image acquisition component by controlling the second combined structure.

One end of the support post 104 is rotatably connected to the base 103, and the other end of the support post 104 is fixedly connected to the test carrier 105 which is configured to receive a wearable device 1. The wearable device 1 is fixed on the test carrier 105 by a detachably connected connection member (not shown), and the placement manner of the wearable device 1 on the test carrier 105 may be adjusted by adjusting the connection member. The controller 101 may be configured to control the support post 104 to rotate on the base 103. For example, the controller 101 may be a computer.

One end of the rotation structure 107 is rotatably connected to the support frame 106, and the other end of the rotation structure 107 is fixedly connected to the image acquisition component 102. The controller 101 is further configured to control the rotation structure 107 to rotate on the support frame. For example, the support frame 106 may be a tripod.

Optionally, the rotation structure 107 may be a pan and tilt head. The rotation of the pan and tilt head may drive the image acquisition component on the pan and tilt head to perform image acquisition within a specified angle range. The image acquisition component 102 may be a video camera.

It is noted that, the pan and tilt head may be an electric pan and tilt head, the rotation functions of the pan and tilt head may be implemented by two executive motors. The pan and tilt head may be classified, on the basis of rotation features, into a horizontal rotatable pan and tilt head which is only able to rotate leftward and rightward and an omni-directional pan and tilt head which is able to rotate leftward, rightward, upward, and downward. In general, the horizontal rotation angle (the rotation angle of the pan and tilt head in the horizontal plane) is 0° to 350°, and the vertical rotation angle (the rotation angle of the pan and tilt head in the vertical plane) is 0° to 90°. For a constant-speed pan and tilt head, the horizontal rotation speed is generally 3° to 10°/s, and the vertical rotation speed is about 4°/s. For a variable-speed pan and tilt head, the horizontal rotation speed is generally 0° to 32°/s, and the vertical rotation speed is about 0° to 16°/s. In some high-speed camera systems, the horizontal rotation speed of the pan and tilt head is as high as 480°/s or more, and the vertical rotation speed of the pan and tilt head is 120°/s or more. The above-mentioned rotation angle and rotation speed are only schematic illustrations, in practice, the pan and tilt head may also have other rotation angles and rotation speeds.

Optionally, if the wearable device 1 is not required to be moved, one end of the support post 104 may be fixedly connected to the base 103; and if the image acquisition component 102 is not required to be moved, no rotation structure 107 may be provided between the image acquisition component 102 and the support frame 106, and the image acquisition component 102 may be directly fixed on the support frame 106.

It is noted that the controller may also include a first sub-controller and a second sub-controller. For example, the first sub-controller and the second sub-controller may each be a computer, wherein the first sub-controller may be configured for controlling the base, the support post and the test carrier, adjusting the position of the wearable device, while the second sub-controller may be configured for controlling the support frame and the rotation structure, adjusting the position of the image acquisition component, which is not limited in embodiments of the present disclosure.

It is noted that the image acquisition component may have only one lens to aim at a monocular presentation interface of the wearable device, or may have two lenses respectively aim at two presentation interfaces of the wearable device (usually the wearable device has a binocular presentation interface). For example, the image acquisition component may be a binocular camera which captures images displayed on the binocular presentation interface, which is not limited in the embodiment of the present disclosure. After each relative movement of the image acquisition component and/or the wearable device, the lens of the image acquisition component may be adjusted accordingly such that the target virtual image acquired by the lens is clearly visible. For example, when the image acquisition component is a video camera, the focus may be adjusted such that the target virtual image captured by the camera lens is clearly visible. The above-mentioned presentation interface of the wearable device is on the side of the wearable device facing the human eyes when worn, which is a visual display interface. Since the side of the lens component of the wearable device which is distal from the display screen in the wearable device is usually the side of the wearable device facing the human eye, the presentation interface of the wearable device is a side of the lens component distal from the display screen.

According to the above system, three cases of adjustment processes in step S12 may be implemented as follows with reference to FIG. 4.

A first case: the wearable device 1 is fixed, and the image acquisition component 102 is swung to adjust the center point of the imaging area from the position aligned with the initial point to the target point. The process of swinging the image acquisition component 102 refers to a process of rotating the image acquisition component about a first specified axis. For example, the image acquisition component 102 may be rotated horizontally or vertically by the rotation structure 107 to implement the swinging of the image acquisition component 102. The swinging trajectory of the image acquisition component 102 is an arc.

A second case: the image acquisition component 102 is fixed, and the wearable device 1 is rotated to adjusted the center point of the imaging area from the position aligned with the initial point to the position aligned with the target point.

A third case: the image acquisition component 102 is swung and the wearable device 1 is rotated to adjust the center point of the imaging area from the position aligned with the initial point to the position aligned with the target point.

In the second case and the third case, the wearable device may be rotated by directly rotating the wearable device. For example, the wearable device 1 is rotated by adjusting the connection structure (not shown in FIG. 4) between the wearable device 1 and the test carrier 105, or by rotating the test carrier 105 on which the wearable device 1 is placed, for example, the support post 104 may be rotated to drive the test carrier 105 above the support post 104 to rotate. It is noted that the rotation process is performed about a second specified axis which may be an axis of the support post 104, and the rotation trajectory of the wearable device 1 is an arc.

In step S2, the angle variation value of the center point of the imaging area of the image acquisition component, in the adjustment from the position aligned with the initial point of the target virtual image to the position aligned with the target point of the target virtual image, is acquired.

In step S1, if the wearable device is rotated, the wearable device itself may record its rotation angle, or the rotation angle of the wearable device may be acquired by an external measurement. For example, the test carrier may be marked with rotation scales, through which the rotation angle of the wearable device may be acquired. And if the image acquisition component is rotated, the image acquisition component itself may record its rotation angle, or the rotation angle of the image acquisition component may be acquired by an external measurement. For example, the rotation structure may record the rotation angle of itself and take this angle as the rotation angle of the image acquisition component. For another example, the image acquisition component and the rotation structure constitute a PTZ (pan, tilt, and zoom) camera or a dome camera, which may record the rotation angle thereof.

When the relative rotation of the wearable device and the image acquisition component is implemented in the manner of the first case described above, the acquired rotation angle of the image acquisition component may be directly acquired as the angle variation value; when the relative rotation of the wearable device and the image acquisition component is implemented in the manner of the second case described above, the acquired rotation angle of the wearable device may be directly acquired as the angle variation value; and when the relative rotation of the wearable device and the image acquisition component is implemented in the manner of the third case described above, the angle variation value may be acquired on the basis of the acquired rotation angle of the wearable device and the acquired rotation angle of the image acquisition component.

In the embodiment of the present disclosure, when the center point of the imaging area is aligned with the target point of the target virtual image, the angle between the line connecting the center point of the imaging area of the image acquisition component and the target point of the wearable device and the line connecting the center point of the imaging area of the image acquisition component and the initial point of the wearable device is the angle variation value.

In step 002, the optical imaging parameter value of the target virtual image is acquired on the basis of the angle variation values acquired in the at least two angle acquisition processes.

In summary, in the method for testing the wearable device according to the embodiments of the present disclosure, an angle variation value corresponding to the relative movement of an image acquisition component is acquired by changing the position of the center point of an imaging area of the image acquisition component in a target virtual image, and an optical imaging parameter value of the target virtual image displayed by a wearable device is acquired on the basis of the angle variation value. Since the optical imaging parameter value is acquired by means of machine measurement, the current problem that an optical imaging parameter value of a target virtual image is subjective and less accurate due to the optical imaging parameter value estimated by means of human eyes is solved, and the finally acquired optical imaging parameter value is more objective and more accurate than that acquired by means of the human eyes.

In the method according to the embodiments of the present disclosure, an image component and/or a wearable device need to be moved to acquire the angle variation value corresponding to the relative movement of the image acquisition component and the wearable device. Since the accuracy of the angle variation value depends on the accuracy of the relative movement distance between the image acquisition component and the wearable device, in each movement process, the center point of the imaging area of the image acquisition component needs to be aligned with the initial point of the target virtual image at first and then moves to the target point, so as to acquire an accurate angle variation value corresponding to the relative movement of the image acquisition component and the wearable device.

Figure 5:
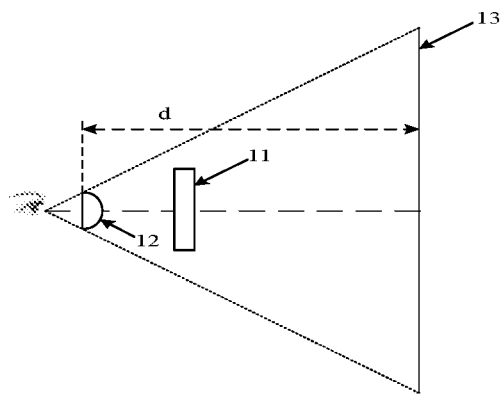
FIG. 5 is a test principle diagram of a method for testing a wearable device according to an embodiment of the present disclosure.

FIG. 5 is a test principle diagram of a method for testing a wearable device according to an embodiment of the present disclosure. As shown in FIG. 5, a target virtual image 13 presented to human eyes by a lens component 12 according to a test image displayed by a display screen 11 of the wearable device is usually an enlarged image of the test image. In the embodiment of the present disclosure, the image acquisition component is used instead of the human eyes for testing. The optical imaging parameter value of the target virtual image reflects the display performance of the wearable device. In the embodiment of the present disclosure, the method for testing the wearable device is introduced in which the optical imaging parameter values are respectively the virtual image distance, the size of the virtual image, the visual angle of the virtual image, and the distortion amount of the virtual image as examples. For example, the method for testing the wearable device may be performed as follows:

In a first implementation, the optical imaging parameter value includes the virtual image distance (the distance d in FIG. 5), which is the distance from the presentation interface (i.e., a side of the lens component distal from the display screen) of the wearable device to the target virtual image.

Figure 6:
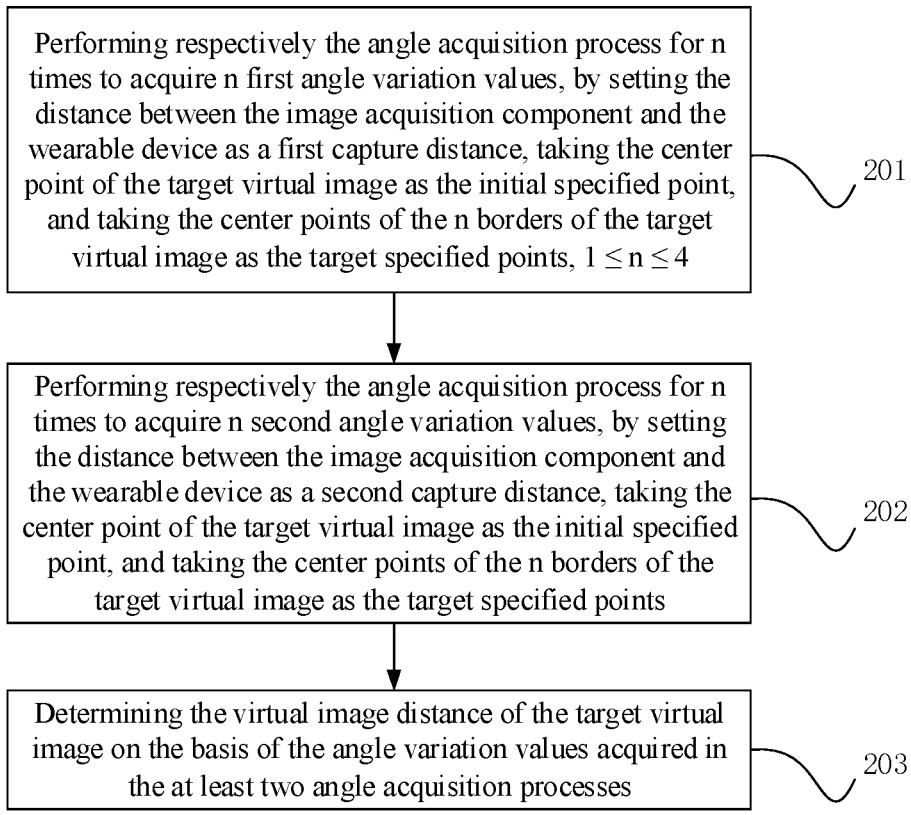
FIG. 6 is a flowchart of a method for acquiring a target virtual image distance according to an embodiment of the present disclosure.

As shown in FIG. 6, the process of acquiring the target virtual image distance may be divided into the following steps.

In step 201, the angle acquisition process is performed for n times to acquire n first angle variation values, by setting the distance between the image acquisition component and the wearable device as a first capture distance, taking the center point of the target virtual image as the initial point, and taking the center points of the n borders of the target virtual image as the target points, 1≤n≤4.

It is noted that the distance between the image acquisition component and the wearable device refers to the distance between the center of gravity (or geometric center) of the image acquisition component and a specified position of the wearable device. In order to facilitate measurement, the specified position is the position where the presentation interface of the wearable device is located, of course, the specified position may also be the position where the display screen in the wearable device is located, or another position where the center of gravity of the wearable device is located, which is not described in detail in the embodiment of the present disclosure.

The image acquisition component and/or the wearable device are moved such that the distance between the image acquisition component and the wearable device is a first capture distance, and then the angle acquisition process is performed. Step S1 may be referred for each angle acquisition process, and will not be repeated herein.

Optionally, it is assumed that the first capture distance between the image acquisition component and the wearable device is t1, n=4, and the target points are the center points of the four borders of the target virtual image, that is, the center point of the left border of the target virtual image, the center point of the right border of the target virtual image, the center point of the upper border of the target virtual image, and the center point of the lower border of the target virtual image.

Figure 7:
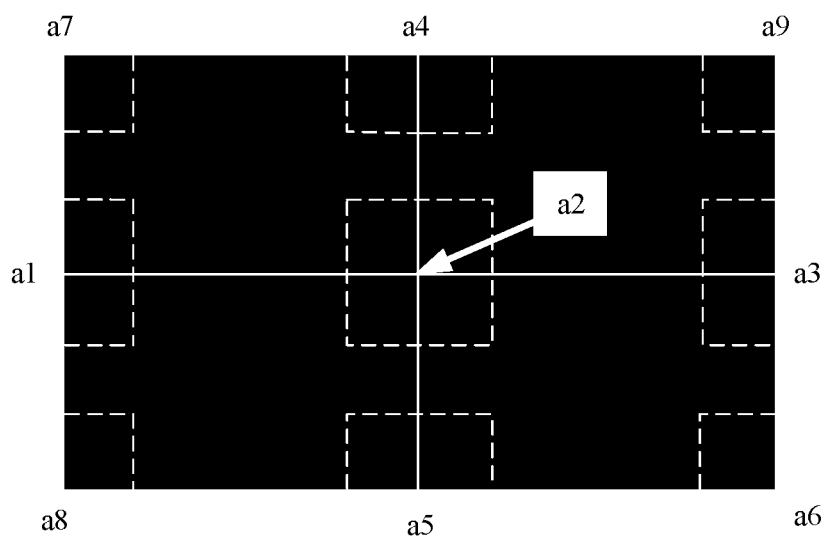
FIG. 7 is a schematic diagram of a target virtual image according to an embodiment of the present disclosure.

For ease of description of the following embodiment, FIG. 7 schematically shows the center point a2, the left border center point a1, the right border center point a3, the upper border center point a4, lower border center point a5, upper left vertex a7, lower left vertex a8, upper right vertex a9, and lower right vertex a6 of the target virtual image.

Figure 8:
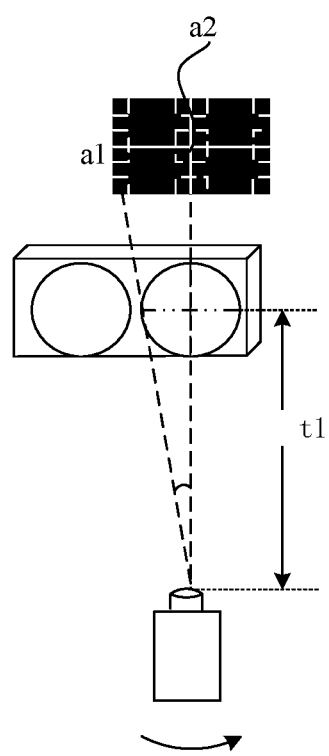
FIG. 8 is a schematic diagram of acquiring a first angle variation value according to an embodiment of the present disclosure.
Figure 9:
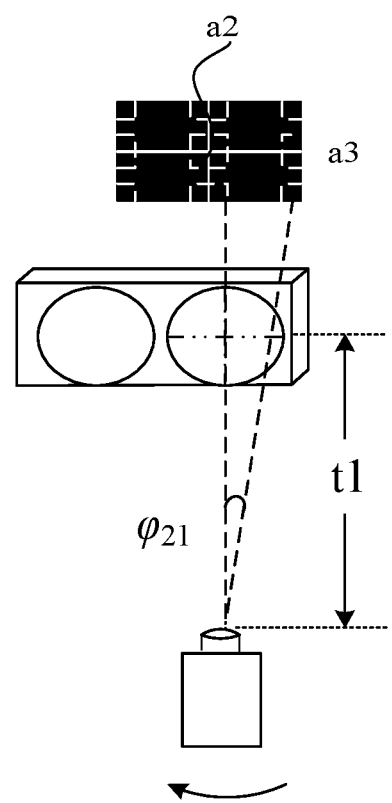
FIG. 9 is another schematic diagram of acquiring a first angle variation value according to an embodiment of the present disclosure.
Figure 10:
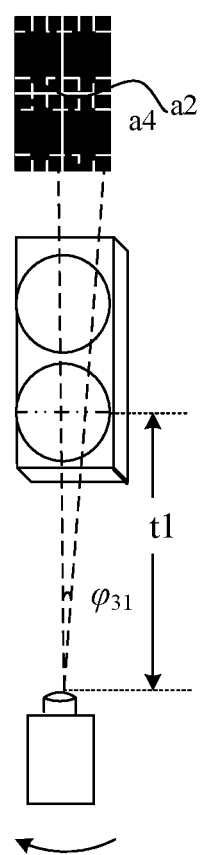
FIG. 10 is another schematic diagram of acquiring a first angle variation value according to an embodiment of the present disclosure.
Figure 11:
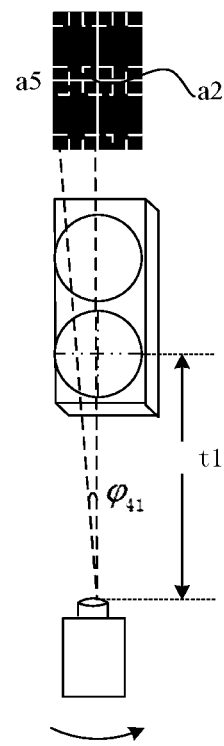
FIG. 11 is another schematic diagram of acquiring a first angle variation value according to an embodiment of the present disclosure.

The angle acquisition process is performed for four times to acquire the corresponding four first angle variation values, which include: as shown in FIG. 8, the process of step S12 is performed to acquire a first angle variation value φH in the adjustment of the center point of the imaging area of the image acquisition component from a position aligned with the center point a2 of the target virtual image to a position aligned with the left border center point a1 of the target virtual image; as shown in FIG. 9, the process of step S12 is performed to acquire a first angle variation value $\varphi_{21}$ in the adjustment of the center point of the imaging area of the image acquisition component from the position aligned with the center point a2 of the target virtual image to a position aligned with the right border center point a3 of the target virtual image. It is noted that, as shown in FIG. 10 and FIG. 11, in order to align the center point a2 of the target virtual image with the upper border center point a4 and the lower border center point a5 of the target virtual image, the wearable device may be at first rotated for 90 degrees, e.g., the wearable device may be rotated clockwise for 90 degrees, and then the process of step S12 is performed to acquire a first angle variation value $\varphi_{31}$ in the adjustment of the center point of the imaging area of the image acquisition component from the position aligned with the center point a2 of the target virtual image to a position aligned with the upper border center point a4 of the target virtual image, and the process of step S12 is performed to acquire a first angle variation value $\varphi_{41}$ in the adjustment of the center point of the imaging area of the image acquisition component from the position aligned with the center point a2 of the target virtual image to a position aligned with the lower border center point a5 of the target virtual image. Optionally, the wearable device may not be rotated if the image acquisition component may be rotated in a vertical direction, for example, the rotation structure connected to the image acquisition component may be an omni-directional pan and tilt head.

Exemplarily, the above-mentioned process for acquiring the four angle variation values may be implemented like the first case in step S12.

In step 202, the angle acquisition process is performed respectively for n times to acquire n second angle variation values, by setting the distance between the image acquisition component and the wearable device as a second capture distance, taking the center point of the target virtual image as the initial point, and taking the center points of the n borders of the target virtual image as the target points.

The image acquisition component and/or the wearable device are moved such that the distance between the image acquisition component and the wearable device is the second capture distance, and then the angle acquisition process is performed for n times. That is, after the distance between the image acquisition component and the wearable device is updated, step 201 is repeatedly performed. For each angle acquisition process, reference may be made to step S1, which is not repeated in the embodiment of the present disclosure. It is noted that, step 202 and step 201 are processes during which the image acquisition component performs the angle acquisition process at different capture distances for the equal times, and thus, n in step 202 is equal to that in step 201.

Optionally, it is assumed that the second capture distance between the image acquisition component and the wearable device is t2, n=4, and the target points are the center points of the four borders of the target virtual image, that is, the center point of the left border of the target virtual image, the center point of the right border of the target virtual image, the center point of the upper border of the target virtual image, and the center point of the lower border of the target virtual image.

Figure 12:
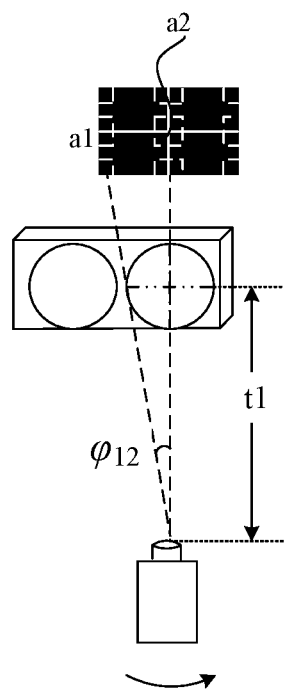
FIG. 12 is a schematic diagram of acquiring a second angle variation value according to an embodiment of the present disclosure.
Figure 13:
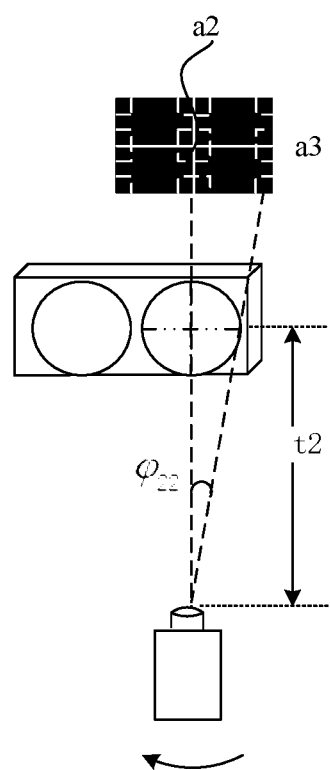
FIG. 13 is another schematic diagram of acquiring a second angle variation value according to an embodiment of the present disclosure.

The angle acquisition process is performed for four times to acquire the corresponding four second angle variation values, which include: as shown in FIG. 12, the process of step S12 is performed to acquire a second angle variation value $\varphi_{12}$ in the adjustment of the center point of the imaging area of the image acquisition component from the position aligned with the center point a2 of the target virtual image to the position aligned with the left border center point a1 of the target virtual image; as shown in FIG. 13, the process of step S12 is performed to acquire a second angle variation value $\varphi_{22}$ in the adjustment of the center point of the imaging area of the image acquisition component from the position aligned with the center point a2 of the target virtual image to the position aligned with the right border center point a3 of the target virtual image. It is noted that, as shown in FIG. 14 and FIG. 15, in order to align the center point of the imaging area of the image acquisition component with the upper border center point a4 and the lower border center point a5 of the target virtual image, the wearable device may be at first rotated for 90 degrees, e.g., the wearable device may be rotated clockwise for 90 degrees in the embodiment of the present disclosure, and then the process of step S12 is performed to acquire a second angle variation value $\varphi_{32}$ in the adjustment of the center point of the imaging area of the image acquisition component from the position aligned with the center point a2 of the target virtual image to the position aligned with the upper border center point a4 of the target virtual image, and the process of step S12 is performed to acquire a second angle variation value $\varphi_{42}$ in the adjustment of the center point of the imaging area of the image acquisition component from the position aligned with the center point a2 of the target virtual image to the position aligned with the lower border center point a5 of the target virtual image. In practice, the wearable device may not be rotated if the image acquisition component may be rotated in a vertical direction, for example, the rotation structure connected to the image acquisition component may be an omni-directional pan and tilt head.

Exemplarily, the above-mentioned process for acquiring the four angle variation values may be implemented in the manner of the first case proposed in step S12.

In step 203, the virtual image distance of the target virtual image is acquired on the basis of the angle variation values acquired in the at least two angle acquisition processes.

The distance variation values corresponding to the n target points may be calculated on the basis of the first capture distance, the second capture distance, the n first angle variation values acquired in step 201 and the n second angle variation values acquired in step 202.

The distance variation value $d_i$ corresponding to the $i^{th}$ target point satisfies the following equation:

$$d_i = \frac{t1 \times \tan \varphi i1 - t2 \times \tan \varphi i2}{\tan \varphi i1 - \tan \varphi i2},$$

wherein $1 \leq i \leq n$, t1 is the first capture distance, t2 is the second capture distance, $\varphi i1$ is the angle variation value of the center point of the imaging area in the adjustment from the position aligned with the initial point of the target virtual image to the position aligned with the $i^{th}$ target point when the distance between the image acquisition component and the wearable device is the first capture distance, and $\varphi i2$ is the angle variation value of the center point of the imaging area in the adjustment from the position aligned with the initial point of the target virtual image to the position aligned with the $i^{th}$ target point when the distance between the image acquisition component and the wearable device is the second capture distance.

Then, the absolute value of the average value of the distance variation values corresponding to the n target points is acquired as the virtual image distance of the target virtual image. It is noted that, when n is 1, the virtual image distance of the target virtual image is the calculated distance variation value corresponding to one target point; when n is at least 2, the finally acquired virtual image distance may be more accurate by means of calculating the average value.

Figure 16:
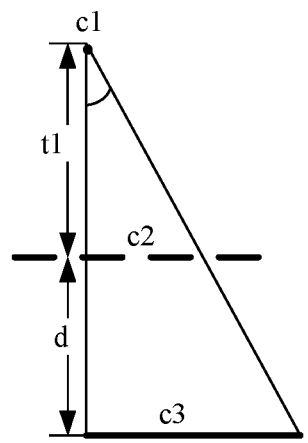
FIG. 16 is a principle schematic diagram of acquiring a virtual image distance according to an embodiment of the present disclosure.
Figure 17:
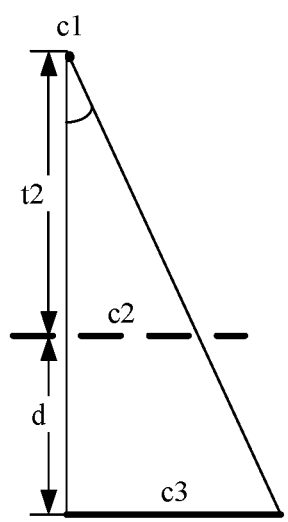
FIG. 17 is another principle schematic diagram of acquiring a virtual image distance according to an embodiment of the present disclosure.

Exemplarily, referring to step 201 and step 202, it is assumed that n is 4, then $1 \leq i \leq 4$. Please refer to FIG. 16 and FIG. 17, which are principle schematic diagrams for acquiring a virtual image distance. In FIG. 16 and FIG. 17, the image acquisition component is located at point c1; the lens component in the wearable device is located on the dotted line shown by c2; a side of the lens component far distal from the display screen in the wearable device is the side of the wearable device facing the image acquisition component; c3 represents the linear distance between the center point of the target virtual image and a certain border center point of the target virtual image in a monocular presentation interface in the wearable device. The certain border center point may be the center point of the left border of the target virtual image, the center point of the right border of the target virtual image, the center point of the upper border of the target virtual image, or the center point of the lower border of the target virtual image. The first capture distance in FIG. 16 is t1, and the first capture distance in FIG. 17 is t2. It may be seen from FIG. 16 and FIG. 17 that, though the first capture distances are different, the size of the lens components, the linear distances between the center point of the target virtual image and a certain border center point of the target virtual image will not change. Therefore, on the basis of the trigonometric function theorem for right triangle, the 4 distance variation values corresponding to the 4 target points may respectively satisfy:

$$d_{left} = \frac{t1 \times \tan \varphi 11 - t2 \times \tan \varphi 12}{\tan \varphi 11 - \tan \varphi 12},$$

$$d_{right} = \frac{t1 \times \tan \varphi 21 - t2 \times \tan \varphi 22}{\tan \varphi 21 - \tan \varphi 22},$$

$$d_{upper} = \frac{t1 \times \tan \varphi 31 - t2 \times \tan \varphi 32}{\tan \varphi 31 - \tan \varphi 32},$$

$$d_{lower} = \frac{t1 \times \tan \varphi 41 - t2 \times \tan \varphi 42}{\tan \varphi 41 - \tan \varphi 42}.$$

In the above formulas, $d_{left}$ is the distance variation value corresponding to the center point of the left border of the target virtual image, $d_{right}$ is the distance variation value corresponding to the center point of the right border of the target virtual image, $d_{upper}$ is the distance variation value corresponding to the center point of the upper border of the target virtual image, and $d_{lower}$ is the distance variation value corresponding to the center point of the lower border of the target virtual image.

Correspondingly, the virtual image distance d of the target virtual image is calculated by $$d = \left| \frac{d_{upper} + d_{lower} + d_{left} + d_{right}}{4} \right|,$$

that is, the virtual image distance of the target virtual image is the absolute value of the average value of the distance variation values corresponding to the above-mentioned four target points.

Optionally, when performing the test, it may be set that t1=10 cm and t2=15 cm.

In summary, in method for testing the wearable device according to the embodiments of the present disclosure, an angle variation value corresponding to the relative movement of an image acquisition component is acquired by changing the position of the center point of an imaging area of the image acquisition component in a target virtual image, and an optical imaging parameter value of the target virtual image displayed by a wearable device is acquired on the basis of the angle variation value. Since the optical imaging parameter value is acquired by means of machine measurement, the current problem that an optical imaging parameter value of a target virtual image is subjective and less accurate due to the optical imaging parameter value estimated by means of human eyes is solved, and the finally acquired optical imaging parameter value is more objective and more accurate than that acquired by means of the human eyes.

In a second implementation manner, the optical imaging parameter value includes the size of the virtual image. The virtual image in the embodiment of the present disclosure is rectangular (determined by the shape of the test image). Therefore, the size of the virtual image may be acquired on the basis of the height and width of the virtual image. Further, since the size of the virtual image is measured in order to know the effect of the target virtual image presented by the display screen of the wearable device through the lens component while the size of the virtual image should reflect as much as possible the display characteristics of the display screen when it is displayed in full screen, the display screen needs to display the test image in full screen so as to acquire a more accurate virtual image size.

Figure 18:
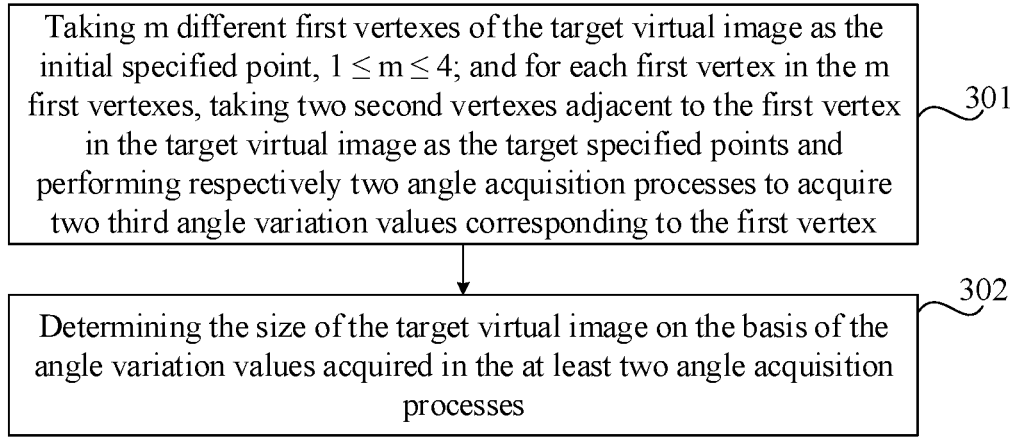
FIG. 18 is a flowchart of a method for acquiring a size of a target virtual image according to an embodiment of the present disclosure.

As shown in FIG. 18, the process of acquiring the size of the virtual image may be divided into the following steps.

In step 301, m different first vertexes of the target virtual image are taken as the initial point, $1 \leq m \leq 4$; and for each first vertex in the m first vertexes, two second vertexes adjacent to the first vertex in the target virtual image are taken as the target points and two angle acquisition processes are performed respectively to acquire two third angle variation values corresponding to the first vertex.

For each angle acquisition process, reference may be made to step S1, which is not repeated in this embodiment of the present disclosure.

Optionally, it is assumed that m=2, and m first vertexes are located on the same diagonal line of the target virtual image. Please continue to refer to FIG. 7, it is assumed that the first vertexes are a7 and a6, and the second vertexes corresponding to a7 and a6 are a8 and a9. FIG. 7 is the target virtual image displayed by the wearable device in FIG. 19 to FIG. 22. It is noted that a1 to a7 in FIG. 7 only serve as marks and are not displayed by the wearable device.

Figure 19:
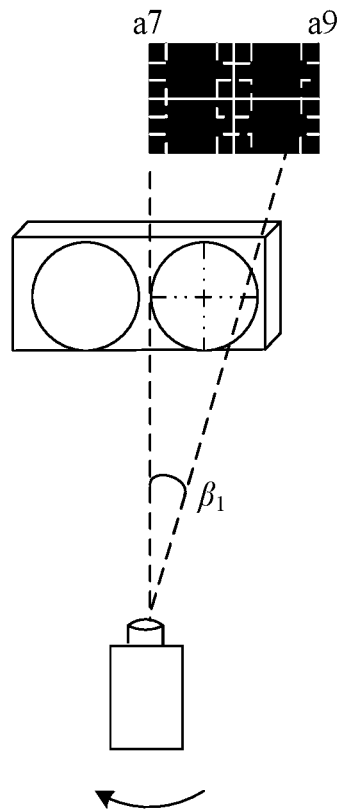
FIG. 19 is a schematic diagram of acquiring a third angle variation value according to an embodiment of the present disclosure.
Figure 20:
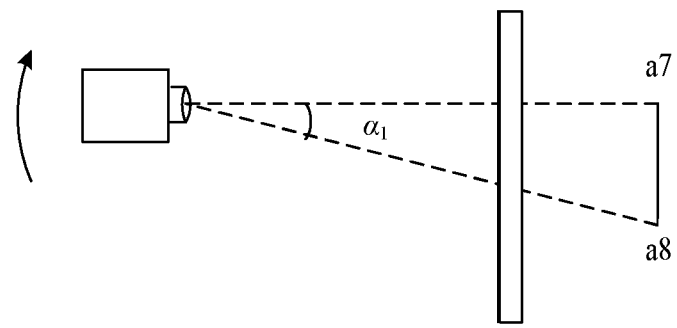
FIG. 20 is another schematic diagram of acquiring a third angle variation value according to an embodiment of the present disclosure.
Figure 21:
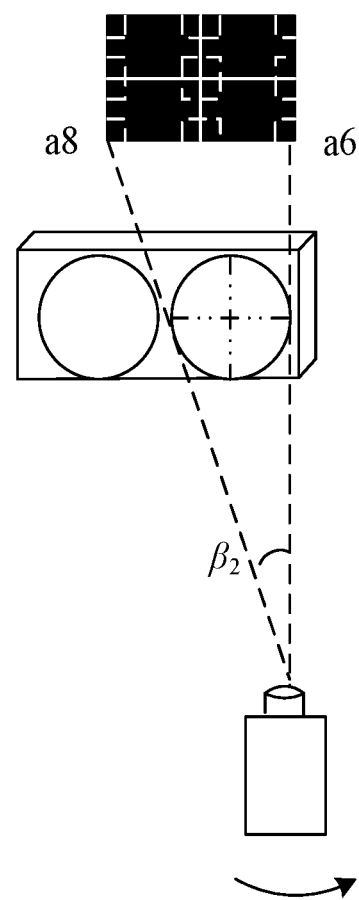
FIG. 21 is another schematic diagram of acquiring a third angle variation value according to an embodiment of the present disclosure.
Figure 22:
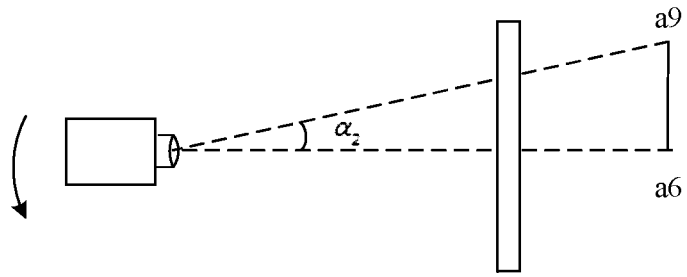
FIG. 22 is another schematic diagram of acquiring a third angle variation value according to an embodiment of the present disclosure.

A process in which different two first vertexes of the target virtual image are taken as the initial point, and for each first vertex in the two first vertexes, two second vertexes adjacent to the first vertex in the target virtual image are taken as the target points and two angle acquisition processes are performed respectively to acquire two third angle variation values corresponding to the first vertex includes: as shown in FIG. 19, the process of step S12 is performed to acquire a third angle variation value $\beta_1$ in the adjustment of the center point of the imaging area of the image acquisition component from the position aligned with the first vertex a7 to the position aligned with the second vertex a9; as shown in FIG. 20, the process of step S12 is performed to acquire a third angle variation value $\alpha_1$ in the adjustment of the center point of the imaging area of the image acquisition component from the position aligned with the first vertex a7 to the position aligned with the second vertex a8; as shown in FIG. 21, the process of step S12 is performed to acquire a third angle variation value $\beta_2$ in the adjustment of the center point of the imaging area of the image acquisition component from a position aligned with the first vertex a6 to the position aligned with the second vertex a8; as shown in FIG. 22, the process of step S12 is performed to acquire a third angle variation value $\alpha_2$ in the adjustment of the center point of the imaging area of the image acquisition component from the position aligned with the first vertex a6 to the position aligned with the second vertex a9.

The angle variation direction of the third angle variation value $\beta_1$ and the third angle variation value $\beta_2$ is parallel to the width direction of the target virtual image; and the angle variation direction of the third angle variation value a1 and the third angle variation value $\alpha_2$ is parallel to the height direction of the target virtual image.

Exemplarily, the above-mentioned process for acquiring the four angle variation values may be implemented in the manner of the first case proposed in step S12.

In step 302, the size of the target virtual image is acquired on the basis of the angle variation values acquired in the at least two angle acquisition processes.

Figure 23:
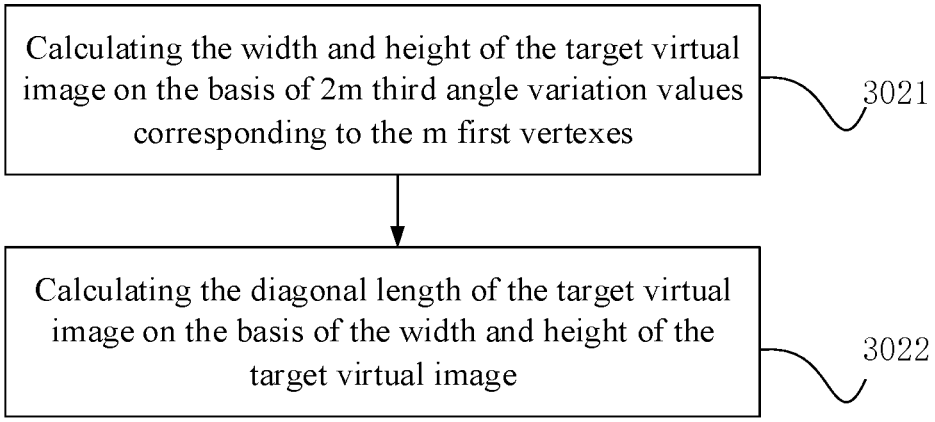
FIG. 23 is a flowchart of a method for acquiring a size of a virtual image on the basis of an angle variation value according to an embodiment of the present disclosure.

For example, as shown in FIG. 23, step 302 may further include the following two sub-steps.

In sub-step 3021, the width and height of the target virtual image are calculated on the basis of 2m third angle variation values corresponding to the m first vertexes.

Referring to step 301, for each first vertex in the m first vertexes, two corresponding third angle variation values may be acquired. Therefore, m first vertexes correspond to 2m third angle variation values.

For example, widths of m target virtual images may be at first calculated on the basis of the third angle variation value of which the angle variation direction is parallel to the width direction of the target virtual image in the 2m third angle variation values, wherein 2m represents the number of vertexes adjacent to the m vertexes, and the number of third angle variation values is 2m. After that, heights of m target virtual images are calculated on the basis of the third angle variation value of which the angle variation direction is parallel to the height direction of the target virtual image in the 2m third angle variation values. Finally, the average value of the widths of the m target virtual images is taken as the width of the target virtual image, and the average value of the heights of the m target virtual image is taken as the height of the target virtual image.

The width $w_k$ of the target virtual image corresponding to the $k^{th}$ first vertex and the height $h_k$ of the target virtual image corresponding to the $k^{th}$ first vertex satisfy the following equations:

$$w_k=|(t+d)\times\tan\beta_k|,$$

$$h_k=|(t+d)\times\tan\alpha_k|;$$

wherein $1\leq k\leq m$, d is the virtual image distance of the target virtual image (which may be acquired from steps 201 to 203 and will not be repeated in the embodiment of the present disclosure); t is the capture distance of the image acquisition component, which may be the first capture distance t1 or the second capture distance t2 or other capture distance; $\beta_k$ is the third angle variation value of which the angle variation direction is parallel to the width direction of the target virtual image in the 2m third angle variation values corresponding to the $k^{th}$ first vertex; and $\alpha_k$ is the third angle variation value of which the angle variation direction is parallel to the height direction of the target virtual image in the 2m third angle variation values corresponding to the $k^{th}$ first vertex.

Exemplarily, in the case that the virtual image distance d has been acquired from step 201 to step 203, t is a known test parameter, m=2, the first vertexes are a7 and a6 in FIG. 7, the second vertexes are a8 and a9 in FIG. 7, and 4 angle variation values $\beta_1$, $\beta_2$, $\alpha_1$, and $\alpha_2$ are acquired according to step 302, then the following equations may be acquired according to the calculation formula of the width of the target virtual image and the calculation formula of the height of the target virtual image corresponding to each vertex:

$$w_2=|(t+d)\times\tan\beta_1|,$$

$$w_2=|(t+d)\times\tan\beta_2|,$$

$$h_1=|(t+d)\times\tan\alpha_1|,$$

$$h_2=|(t\ d)\times\tan\alpha_2|;$$

wherein $w_1$ is the length between vertex a7 and vertex a9; $w_2$ is the length between vertex a8 and vertex a6; $h_1$ is the length between vertex a7 and vertex a8; $h_2$z is the length between vertex a9 and vertex a6. The resulting width w of the target virtual image is an average value of the widths of the target virtual image corresponding to two first vertexes, i.e., $$w=\frac{w_1+w_2}{2}.$$

The resulting height h of the target virtual image is an average value of the heights of the target virtual image corresponding to two first vertexes, i.e., $$h=\frac{h_1+h_2}{2}.$$

It is noted that, when m is 1, the width of the target virtual image is the calculated width of one target virtual image, the height of the target virtual image is the calculated height of one target virtual image; and when m≥2, the finally acquired height and width of the virtual image may be made more accurate by calculating an average value.

In sub-step 3022, the diagonal length of the target virtual image is calculated on the basis of the width and height of the target virtual image.

It is noted that the size of a virtual image is generally identified by the diagonal length (in inches). In the embodiment of the present disclosure, the size of the target virtual image includes the diagonal length of the target virtual image.

Therefore, the diagonal length v of the target virtual image may be calculated on the basis of the width w and the height h of the target virtual image, and the diagonal calculation formula is as follows:

$$v=\frac{\sqrt{w^2+h^2}}{2.54},$$

in inches.

The calculation result of $\sqrt{w^2+h^2}$ is the diagonal length of the virtual image in centimeters. Since inch is usually used as a unit to identify a diagonal length, the unit of the diagonal length is converted from centimeter to inch by dividing $\sqrt{w^2+h^2}$ with 2.54 in the above formula of the diagonal length in the embodiment of the present disclosure.

It is worth noting that in the above steps 301 and 302, the distance between the image acquisition component and the wearable device does not change, for example, the distance between the two may always be maintained at 10 cm.

In summary, in the method for testing the wearable device according to the embodiments of the present disclosure, an angle variation value corresponding to the relative movement of an image acquisition component is acquired by changing the position of the center point of an imaging area of the image acquisition component in a target virtual image, and an optical imaging parameter value of the target virtual image displayed by a wearable device is acquired on the basis of the angle variation value. Since the optical imaging parameter value is acquired by means of machine measurement, the current problem that an optical imaging parameter value of a target virtual image is subjective and less accurate due to the optical imaging parameter value estimated by means of human eyes is solved, and the finally acquired optical imaging parameter value is more objective and more accurate than that acquired by means of the human eyes.

Figure 24:
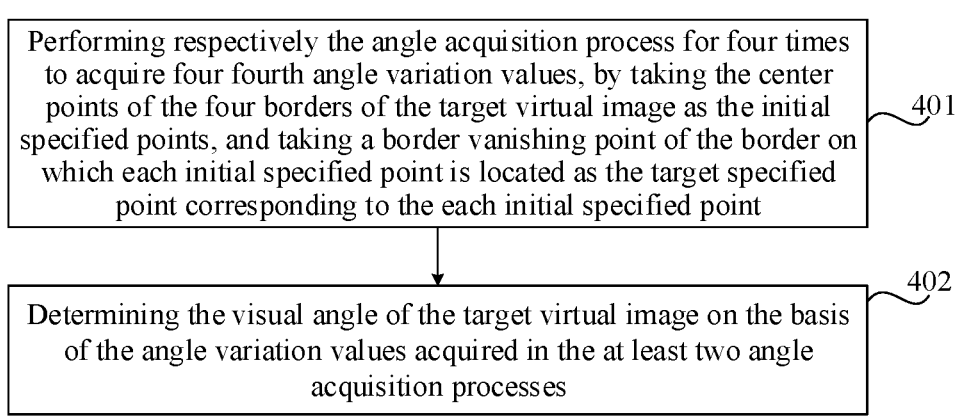
FIG. 24 is a flowchart of a method for acquiring a visual angle of a target virtual image according to an embodiment of the present disclosure.

In a third implementation, the optical imaging parameter value includes the visual angle of the target virtual image, and the maximum visual angle of the target virtual image may be acquired by the image acquisition component of the parameter value by acquiring the visual angle of the target virtual image. As shown in FIG. 24, the process of acquiring the visual angle of the virtual image may include the following steps.

In step 401, the angle acquisition process is performed respectively for four times to acquire four fourth angle variation values, by taking the center points of the four borders of the target virtual image as the initial points, and taking the border vanishing point of the border on which each initial point is located as the target point corresponding to the each initial point.

The center points of the four borders correspond to the four vanishing points. The vanishing point is a critical point, which is described as follows by taking one angle acquisition process as an example and assuming that the center point of a certain border is the initial point for the image acquisition component: in a process of relatively rotating the center point of the imaging area of the image acquisition component from a position aligned with the center point of the certain border, the certain border gradually decreases from the visual angle of the center point of the imaging area of the image acquisition component and completely disappears, and the point aligned with the center point of imaging area of the image acquisition component at the moment that the certain border completely disappears is the border vanishing point of the certain border.

In the embodiment of the present disclosure, the center points of the four borders of the target virtual image are taken as the initial points. Please continue to refer to FIG. 7, the center points of the four borders are respectively: a1, a4, a3, and a5.

Figure 25:
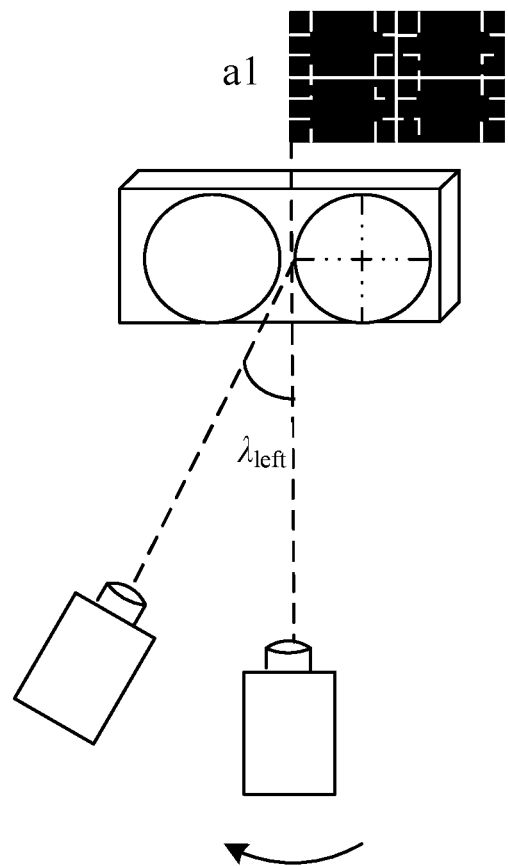
FIG. 25 is a schematic diagram of acquiring a fourth angle variation value according to an embodiment of the present disclosure.
Figure 26:
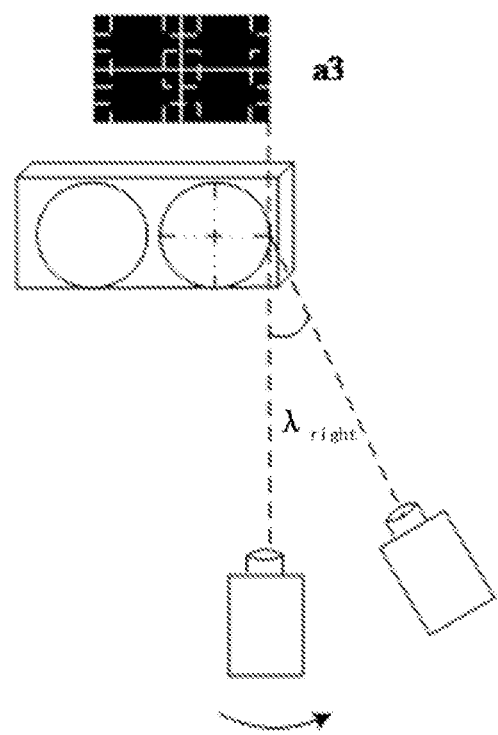
FIG. 26 is another schematic diagram of acquiring a fourth angle variation value according to an embodiment of the present disclosure.
Figure 27:
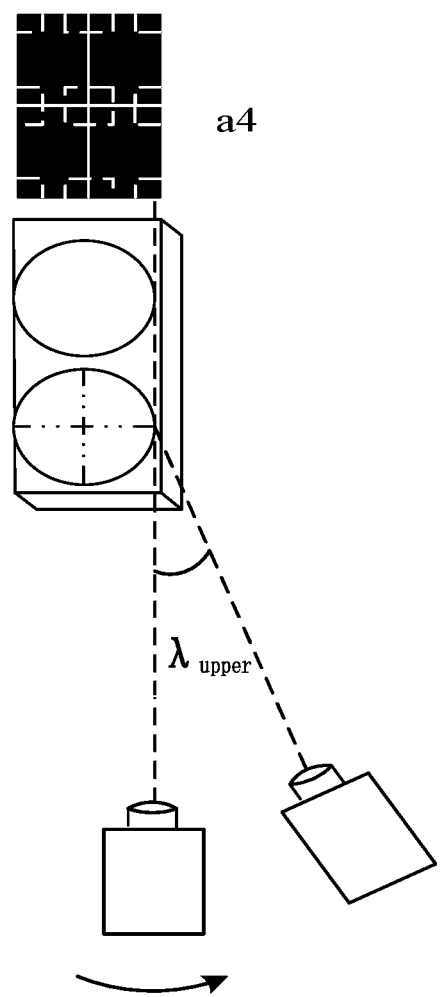
FIG. 27 is another schematic diagram of acquiring a fourth angle variation value according to an embodiment of the present disclosure.
Figure 28:
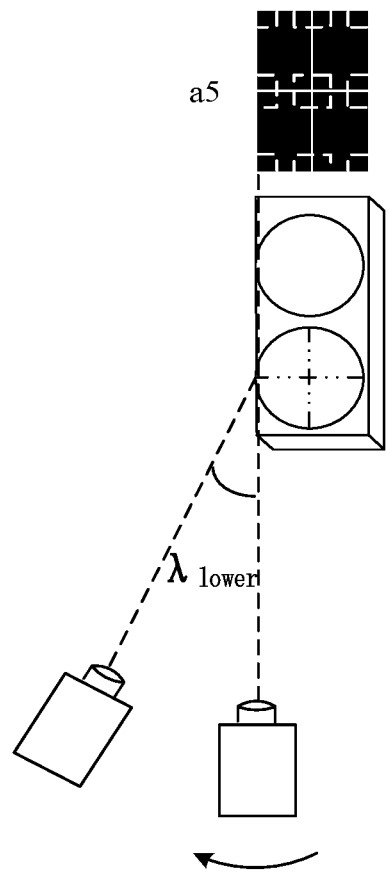
FIG. 28 is another schematic diagram of acquiring a fourth angle variation value according to an embodiment of the present disclosure.

Correspondingly, the process of performing the four angle acquisition processes to acquire four fourth angle variation values includes: as shown in FIG. 25, the process of step S12 is performed to acquire an angle variation value $\lambda_{left}$ in the adjustment of the center point of the imaging area of the image acquisition component from the position aligned with the left border center point a1 of the target virtual image to a position aligned with the border vanishing point of the left border of the target virtual image; as shown in FIG. 26, the process of step S12 is performed to acquire an angle variation value $\lambda_{right}$ in the adjustment of the center point of the imaging area of the image acquisition component from the position aligned with the right border center point a3 of the target virtual image to a position aligned with the border vanishing point of the right border of the target virtual image. It is noted that, as shown in FIG. 27 and FIG. 28, in order to align the center point of the imaging area of the image acquisition component with the border vanishing point of the left border and the border vanishing point of the right border, the wearable device may be at first rotated for 90 degrees, e.g., the wearable device may be rotated clockwise for 90 degrees, and then the process of step S12 is performed to acquire an angle variation value $\lambda_{upper}$ in the adjustment of the center point of the imaging area of the image acquisition component from the position aligned with the upper border center point a4 of the target virtual image to a position aligned with the border vanishing point of the upper border of the target virtual image, and the process of step S12 is performed to acquire an angle variation value $\lambda_{lower}$ in the adjustment of the center point of the imaging area of the image acquisition component from the position aligned with the lower border center point a5 of the target virtual image to a position aligned with the border vanishing point of the lower border of the target virtual image. In practice, the wearable device may not be rotated if the image acquisition component may be rotated in a vertical direction, for example, the rotation structure connected to the image acquisition component may be an omni-directional pan and tilt head.

Exemplarily, the above-mentioned process for acquiring the four angle variation values may be implemented in the manner of the second case proposed in step S12.

In step 402, the visual angle of the target virtual image is acquired on the basis of the angle variation values acquired in the at least two angle acquisition processes.

Exemplarily, the horizontal visual angle $\lambda_{horizontal}$ of the target virtual image may be calculated on the basis of the fourth angle variation values $\lambda_{left}$ and $\lambda_{right}$ parallel to the width direction of the target virtual image in the four fourth angle variation values. Then, the vertical visual angle $\lambda_{vertical}$ the target virtual image may be calculated on the basis of the fourth angle of variation values $\lambda_{upper}$ and $\lambda_{lower}$ parallel to the height direction of the target virtual image in the four fourth angle variation values.

It is noted that, $\lambda_{left}$, $\lambda_{right}$, $\lambda_{upper}$, and $\lambda_{lower}$ are positive angle variation values. In practice, if a negative angle variation value is acquired due to a different angle acquisition coordinate system, a corresponding positive angle variation value may be acquired by performing an absolute value operation on the negative angle variation value before performing subsequent operations.

The $\lambda_{horizontal}$ and the $\lambda_{vertical}$ respectively satisfy the following equations:

$$\lambda_{horizontal} = \lambda_{left} + \lambda_{right},$$

$$\lambda_{vertical} = \lambda_{upper} + \lambda_{lower}.$$

For example, when $\lambda_{left}=30°$, $\lambda_{right}=30°$, $\lambda_{upper}=45°$, $\lambda_{upper}=45°$, the horizontal visual angle $\lambda_{horizontal}$ of the target virtual image is 60 degrees, and the vertical visual angle $\lambda_{vertical}$ of the target virtual image is 90 degrees.

It is worth noting that in the above steps 401 and 402, the distance between the image acquisition component and the wearable device does not change, for example, the distance between the two may always be maintained at 15 cm.

In summary, in the method for testing the wearable device according to the embodiments of the present disclosure, an angle variation value corresponding to the relative movement of an image acquisition component is acquired by changing the position of the center point of an imaging area of the image acquisition component in a target virtual image, and an optical imaging parameter value of the target virtual image displayed by a wearable device is acquired on the basis of the angle variation value. Since the optical imaging parameter value is acquired by means of machine measurement, the current problem that an optical imaging parameter value of a target virtual image is subjective and less accurate due to the optical imaging parameter value estimated by means of human eyes is solved, and the finally acquired optical imaging parameter value is more objective and more accurate than that acquired by means of the human eyes.

Figure 29:
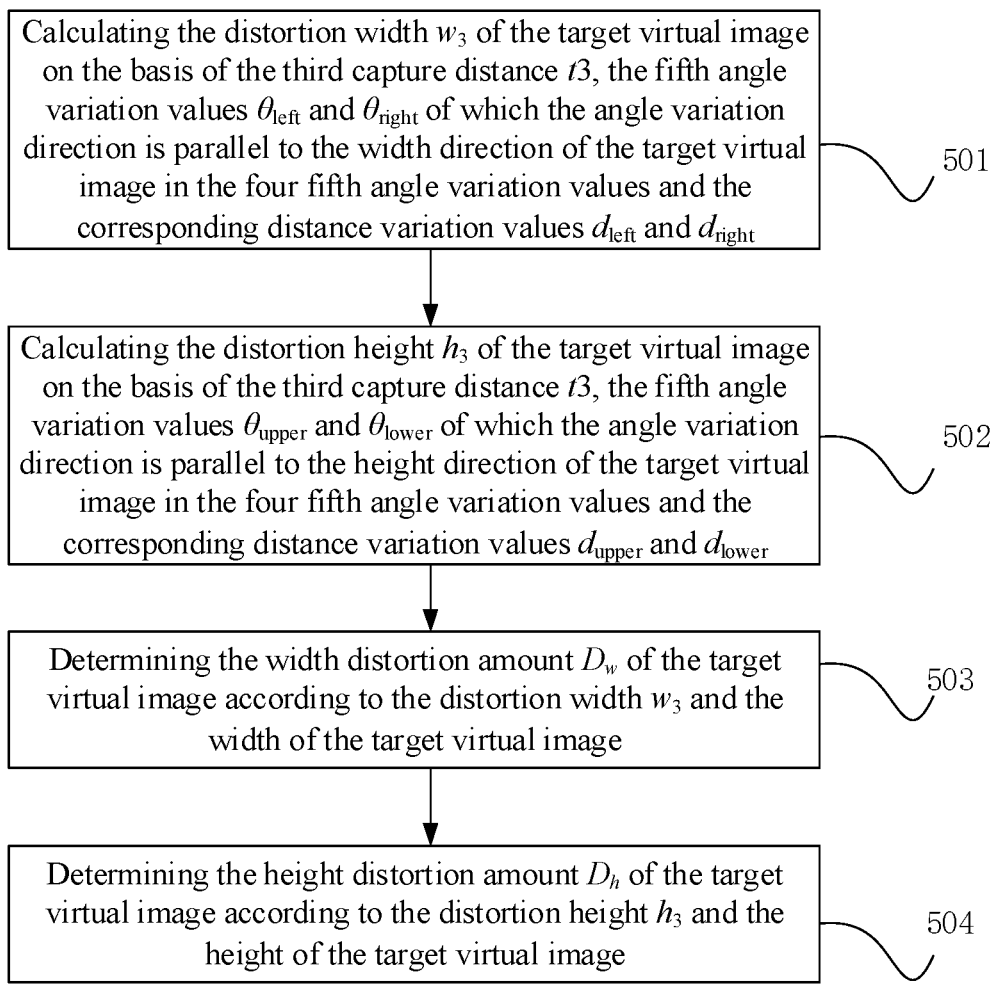
FIG. 29 is a flowchart of a method for acquiring a distortion amount of a target virtual image according to an embodiment of the present disclosure.

In a fourth implementation manner, the optical imaging parameter value includes the distortion amount of the target virtual image. The distortion amount of the target virtual image is acquired on the basis of the virtual image distance of the target virtual image and the size of the virtual image. The virtual image distance may be acquired by steps 201 to 203, the size of the virtual image may be acquired by steps 301 and 302, and the specific acquisition process is not repeated in the embodiment of the present disclosure. In the embodiment of the present disclosure, it is provided that the virtual image distance and the size of the virtual image have been acquired. As shown in FIG. 29, the step for acquiring the distortion amount of the target virtual image includes:

In step 501, the distortion width $w_3$ of the target virtual image is calculated on the basis of the third capture distance t3, the fifth angle variation values $\theta_{left}$ and $\theta_{right}$ of which the angle variation direction is parallel to the width direction of the target virtual image in the four fifth angle variation values and the corresponding distance variation values $d_{left}$ and $d_{right}$.

The distortion width $w_3$ satisfies the following equations:

$$w_3 = (d_{left} + t3) \times \tan \theta_{left} + (d_{right} + t3) \times \tan \theta_{right}.$$

It is noted that, the third capture distance t3 may be the first capture distance or the second capture distance in steps 201 to 203, the fifth angle variation value may be the first angle variation value or the second angle variation value in steps 201 to 203, which will not be limited in the embodiment of the present disclosure.

In step 502, the distortion height $h_3$ of the target virtual image is calculated on the basis of the third capture distance t3, the fifth angle variation values $\theta_{upper}$ and $\theta_{lower}$ of which the angle variation direction is parallel to the height direction of the target virtual image in the four fifth angle variation values and the corresponding distance variation values $d_{upper}$ and $d_{lower}$.

The distortion height $h_3$ satisfies the following equation:

$$h_3 = (d_{upper} + t3) \times \tan \theta_{upper} + (d_{lower} + t3) \times \tan \theta_{lower}.$$

In step 503, the width distortion amount $D_w$ of the target virtual image is acquired according to the distortion width $w_3$ and the width of the target virtual image.

The width of the target virtual image may be acquired from steps 301 to 302, which is not repeated in the embodiment of the present disclosure.

Optionally, absolute values of the differences between the distortion width $w_3$ and the respective widths of the target virtual image acquired in p tests may be calculated to acquire absolute values of p width differences, p being an integer greater than or equal to 1. Then the percentage of the average value of the absolute values of p width differences in the distortion width $w_3$ is acquired as the width distortion amount $D_w$ of the target virtual image.

Exemplarily, it is assumed that p=2, and two tests are performed to acquired corresponding 2 widths of the target virtual image: w1 and w2, which may be w1 and w2 calculated in step 302. The absolute values of the differences between the distortion width $w_3$ and the 2 widths of the target virtual image acquired in the 2 tests may respectively be: |w1−w3| and |w2−w3|, and the percentage of the average value of the absolute values of 2 width differences in the distortion width $w_3$ is calculated to acquire the width distortion amount $D_w$ as follows:

$$D_w = \left( \frac{|w1 - w3| + |w2 - w3|}{2w3} \right) \times 100\%.$$

In step 504, the height distortion amount $D_h$ of the target virtual image is acquired according to the distortion height $h_3$ and the height of the target virtual image.

Optionally, absolute values of the differences between the distortion height $h_3$ and the respective heights of the target virtual image acquired in p tests may be calculated to acquire absolute values of p height differences, p being an integer greater than or equal to 1. Then the percentage of the average value of the absolute values of p height differences in the distortion height $h_3$ is acquired as the height distortion amount $D_h$ of the target virtual image.

Exemplarily, it is assumed that p=2, and two tests are performed to acquire corresponding two heights of the target virtual image: h1 and h2, which may be the h1 and h2 calculated in step 302. The absolute values of the differences between the distortion height $h_3$ and the two heights of the target virtual image acquired in the two tests may respectively be: |h1−h3| and |h2−h3|, and the percentage of the average value of the absolute values of two height differences in the distortion height $h_3$ is calculated to acquire the height distortion amount $D_h$ as follows:

$$D_h = \left( \frac{|h1 - h3| + |h2 - h3|}{2h3} \right) \times 100\%.$$

It is noted that, when p is 1, the percentage of the absolute value of the difference between the distortion width of the target virtual image and the width of the target virtual image in the distortion width is just the width distortion amount, and the percentage of the absolute value of the difference between the distortion height of the target virtual image and the height of the target virtual image in the distortion height is just the height distortion amount; and when p is at least two, the finally acquired width distortion amount and height distortion amount of the virtual image may be more accurate by calculating the average value.

It is worth noting that in steps 501 and 504, the distance between the image acquisition component and the wearable device does not change. For example, the distance between the two may always be maintained at 10 cm.

In summary, in the method for testing the wearable device according to the embodiments of the present disclosure, an angle variation value corresponding to the relative movement of an image acquisition component is acquired by changing the position of the center point of an imaging area of the image acquisition component in a target virtual image, and an optical imaging parameter value of the target virtual image displayed by a wearable device is acquired on the basis of the angle variation value. Since the optical imaging parameter value is acquired by means of machine measurement, the current problem that an optical imaging parameter value of a target virtual image is subjective and less accurate due to the optical imaging parameter value estimated by means of human eyes is solved, and the finally acquired optical imaging parameter value is more objective and more accurate than that acquired by means of the human eyes.

Figure 30:
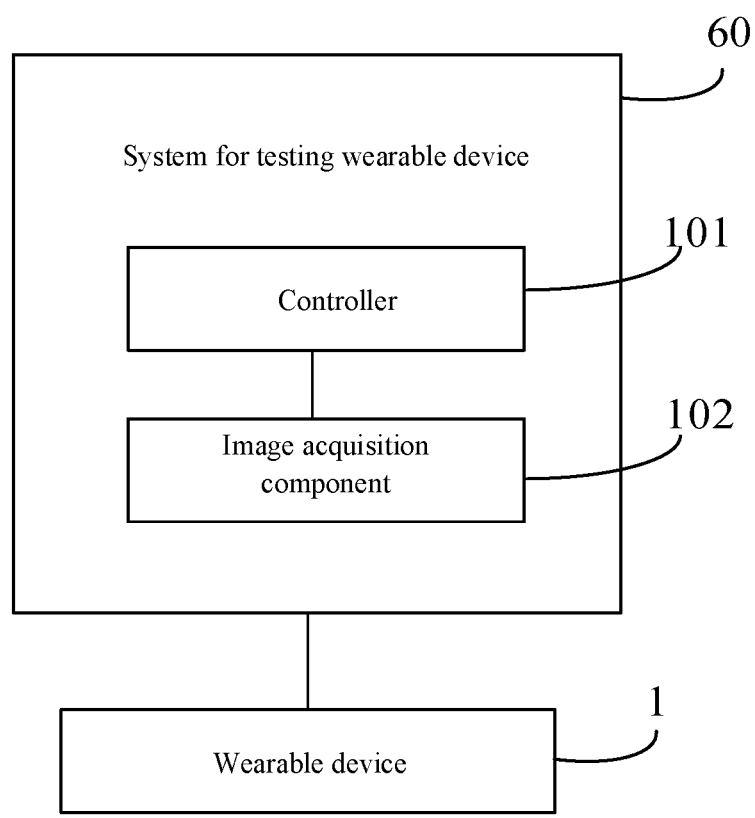
FIG. 30 is a schematic diagram of a system for testing a wearable device according to an embodiment of the present disclosure.

FIG. 30 illustrates system 60 for testing a wearable device according to an embodiment of the present disclosure. As shown in FIG. 30, the system includes a controller 101 and an image acquisition component 102.

The controller 101 is configured to repeatedly perform an angle acquisition processes by using different parameters, the angle acquisition process including:

adjusting a center point of an imaging area of the image acquisition component 102 from a position aligned with an initial point of a target virtual image to a position aligned with a target point of the target virtual image, wherein the target virtual image is a virtual image presented by a lens component according to a test image, and the line connecting the center point of the imaging area and the initial point is parallel to the axis of the lens component when the center point of the imaging area is aligned with the initial point, and acquiring the angle variation value of the center point of the imaging area of the image acquisition component 102 in the adjustment from the position aligned with the initial point of the target virtual image to the position aligned with the target point of the target virtual image; and the controller 101 is further configured to acquire an optical imaging parameter value of the target virtual image on the basis of the angle variation values acquired in the at least two angle acquisition processes.

In summary, in the method for testing a wearable device according to the embodiments of the present disclosure, an angle variation value corresponding to the relative movement of an image acquisition component is acquired by changing the position of the center point of an imaging area of the image acquisition component in a target virtual image, and an optical imaging parameter value of the target virtual image displayed by a wearable device is acquired on the basis of the angle variation value. Since the optical imaging parameter value is acquired by means of machine measurement, the current problem that an optical imaging parameter value of a target virtual image is subjective and less accurate due to the optical imaging parameter value estimated by means of human eyes is solved, and the finally acquired optical imaging parameter value is more objective and more accurate than that acquired by means of the human eyes.

Optionally, as shown in FIG. 4, the system 60 further includes:

the base 103, the support post 104, and the test carrier 105, wherein one end of the support post 104 is rotatably connected to the base 103, and the other end of the support post 104 is fixedly connected to the test carrier 105.

The test carrier 105 is configured to receive the wearable device 1.

The controller 101 is configured to control the support post 104 to rotate on the base 103.

Optionally, the system 60 may further include:

the support frame 106 and the rotation structure 107, wherein one end of the rotation structure 107 is rotatably connected to the support frame 106, and the other end of the rotation structure 107 is fixedly connected to the image acquisition component 102.

The controller 101 is configured to control the rotation structure 107 to rotate on the support frame 106.

Optionally, the rotation structure 107 may be a pan and tilt head, and the image acquisition component 102 is a video camera.

Optionally, the optical imaging parameter value includes a virtual image distance of the target virtual image.

For related explanations about the base 103, the support post 104, the test carrier 105, the support frame 106 and the rotation structure 107, reference may be made to step S12, which is not repeated in the embodiment of the present disclosure.

The controller 101 is further configured to: perform respectively the angle acquisition process for n times to acquire n first angle variation values, by setting the distance between the image acquisition component and the other side of the lens component as a first capture distance, taking the center point of the target virtual image as the initial point, and taking the center points of the n borders of the target virtual image as the target points, $1 \leq n \leq 4$;

perform respectively the angle acquisition process for n times to acquire n second angle variation values, by setting the distance between the image acquisition component and the other side of the lens component as a second capture distance, taking the center point of the target virtual image as the initial point, and taking the center points of the n borders of the target virtual image as the target points.

Optionally, the controller 101 is further configured to: calculate the distance variation values corresponding to the n target points on the basis of the n first angle variation values and the n second angle variation values, and the distance variation value $d_i$ corresponding to the $i^{th}$ target point satisfies the following equation:

$$d_i = \frac{t1 \times \tan \varphi i1 - t2 \times \tan \varphi i2}{\tan \varphi i1 - \tan \varphi i2},$$

wherein $1 \leq i \leq n$, t1 is the first capture distance, t2 is the second capture distance, $\varphi i1$ is the angle variation value of the center point of the imaging area in the adjustment from the position aligned with the initial point of the target virtual image to the position aligned with the $i^{th}$ target point when the distance between the image acquisition component and the other side of the lens component is the first capture distance, and $\varphi i2$ is the angle variation value of the center point of the imaging area in the adjustment from the position aligned with the initial point of the target virtual image to the position aligned with the $i^{th}$ target point when the distance between the image acquisition component and the other side of the lens component is the second capture distance; and the controller 101 is further configured to acquire the absolute value of the average value of the distance variation values corresponding to the n target points as the virtual image distance of the target virtual image.

Optionally, n=4, n target points are respectively the center point of the left border of the target virtual image, the center point of the right border of the target virtual image, the center point of the upper border of the target virtual image and the center point of the lower border of the target virtual image.

Optionally, the borders of the test image define a rectangle, the optical imaging parameter value includes the size of the target virtual image, and the controller 101 is further configured to: take m different first vertexes of the target virtual image as the initial point, $1 \leq m \leq 4$; and for each first vertex in the m first vertexes, take two second vertexes adjacent to the first vertex in the target virtual image as the target points and perform respectively two angle acquisition processes to acquire two third angle variation values corresponding to the first vertex.

Optionally, the size of the target virtual image includes the diagonal length of the target virtual image, and the controller 101 is further configured to: calculate the width and height of the target virtual image on the basis of 2m third angle variation values corresponding to the m first vertexes; and calculate the diagonal length of the target virtual image on the basis of the width and height of the target virtual image.

Optionally, the controller 101 is further configured to: calculate widths of m target virtual images on the basis of the third angle variation value of which the angle variation direction is parallel to the width direction of the target virtual image in the 2m third angle variation values; and calculate heights of m target virtual images on the basis of the third angle variation value of which the angle variation direction is parallel to the height direction of the target virtual image in the 2m third angle variation values;

the width $w_k$ of the target virtual image corresponding to the $k^{th}$ first vertex and the height $h_k$ of the target virtual image corresponding to the $k^{th}$ first vertex satisfy the following equations:

$$w_k = |(t+d) \times \tan \beta_k|,$$

$$h_k = |(t+d) \times \tan \alpha_k|;$$

wherein $1 \leq k \leq m$, d is the virtual image distance of the target virtual image; t is the capture distance of the image acquisition component; $\beta_k$ is the third angle variation value of which the angle variation direction is parallel to the width direction of the target virtual image in the 2m third angle variation values corresponding to the $k^{th}$ first vertex; and $\alpha_k$ is the third angle variation value of which the angle variation direction is parallel to the height direction of the target virtual image in the 2m third angle variation values corresponding to the $k^{th}$ first vertex;

take the average value of the widths of the m target virtual image as the width of the target virtual image; and take the average value of the heights of the m target virtual image as the height of the target virtual image.

Optionally, m=2, and m first vertexes are located on the same diagonal line of the target virtual image.

Optionally, the controller 101 is further configured to: calculate the diagonal length v of the target virtual image on the basis of the width w and the height h of the target virtual image, and the diagonal calculation formula is as follows:

$$v = \frac{\sqrt{w^2 + h^2}}{2.54},$$

in inches.

Optionally, the borders of the test image define a rectangle, and the optical imaging parameter value includes the visual angle of the target virtual image. The controller 101 is further configured to: perform respectively the angle acquisition process for four times to acquire four fourth angle variation values, by taking the center points of the four borders of the target virtual image as the initial points, and taking the border vanishing point of each border of the target virtual image as the target point.

Optionally, the controller 101 is further configured to: calculate the horizontal visual angle $\lambda_{horizontal}$ of the target virtual image on the basis of the fourth angle variation values $\lambda_{left}$ and $\lambda_{right}$ parallel to the width direction of the target virtual image in the four fourth angle variation values; and calculate the vertical visual angle $\lambda_{vertical}$ of the target virtual image on the basis of the fourth angle variation values $\lambda_{upper}$ and $\lambda_{lower}$ parallel to the height direction of the target virtual image in the four fourth angle variation values.

The $\lambda_{horizontal}$ and the $\lambda_{vertical}$ respectively satisfy the following equations:

$$\lambda_{horizontal} = \lambda_{left} + \lambda_{right},$$

$$\lambda_{vertical} = \lambda_{upper} + \lambda_{lower}.$$

Optionally, the optical imaging parameter value includes the distortion amount of the target virtual image, and the controller 101 is further configured to: acquire the distortion amount of the target virtual image according to the distance variation values corresponding to four target points, four fifth angle variation values and a third capture distance of the image acquisition component corresponding to the four fifth angle variation values, the fifth angle variation value being the first angle variation value or the second angle variation value.

Optionally, the controller 101 is further configured to:

calculate the distortion width $w_3$ of the target virtual image on the basis of the third capture distance t3, the fifth angle variation values $\theta_{left}$ and $\beta_{right}$ of which the angle variation direction is parallel to the width direction of the target virtual image in the four fifth angle variation values and the corresponding distance variation values $d_{left}$ and $d_{right}$;

calculate the distortion height $h_3$ of the target virtual image on the basis of the third capture distance t3, the fifth angle variation values $\theta_{upper}$ and $\theta_{lower}$ of which the angle variation direction is parallel to the height direction of the target virtual image in the four fifth angle variation values and the corresponding distance variation values $d_{upper}$ and $d_{lower}$;

acquire the width distortion amount of $D_w$ the target virtual image according to the distortion width $w_3$ and the width of the target virtual image; and acquire the height distortion amount $D_h$ of the target virtual image according to the distortion height $h_3$ and the height of the target virtual image.

Optionally, the distortion width and distortion height satisfy:

$$w_3 = (d_{left} + t3) \times \tan \theta_{left} + (d_{right} + t3) \times \tan \theta_{right},$$

$$h_3 = (d_{upper} + t3) \times \tan \theta_{upper} + (d_{lower} + t3) \times \tan \theta_{lower}.$$

Optionally, the controller 101 is further configured to: calculate absolute values of the differences between the distortion width $w_3$ and the respective widths of the target virtual image acquired in p tests to acquire absolute values of p width differences, p being an integer greater than or equal to 1; and acquire the percentage of the average value of the absolute values of p width differences in the distortion width $w_3$ as the width distortion amount $D_w$ of the target virtual image.

The process of acquiring the height distortion amount $D_h$ of the target virtual image according to the distortion height $h_3$ and the height of the target virtual image includes:

calculating absolute values of the differences between the distortion height $h_3$ and the respective heights of the target virtual image acquired in p tests to acquire absolute values of p height differences, p is an integer greater than or equal to 1; and acquiring the percentage of the average value of the absolute values of p height differences in the distortion height $h_3$ as the height distortion amount $D_h$ of the target virtual image.

Optionally, the controller 101 is further configured to:

fix the wearable device and swing the image acquisition component to adjust the center point of the imaging area from the position aligned with the initial point to the position aligned with the target point; or fix the image acquisition component and rotate the wearable device to adjust the center point of the imaging area from the position aligned with the initial point to the position aligned with the target point.

Optionally, when the initial point is not the center point of the target virtual image, the controller 101 is further configured to:

align the center point of the imaging area of the image acquisition component with the center point of the target virtual image and make the line connecting the center point of the imaging area and the initial point to be coaxial with the lens component, before the center point of the imaging area being rotated relatively from the position aligned with the initial point of the target virtual image to the position aligned with the target point of the target virtual image; and translate the center point of the imaging area to the initial point.

Optionally, the wearable device is configured such that the test image is a rectangular image with a first color as a base and a second color as a border, wherein two perpendicularly intersected symmetry axes in the second color are displayed on the test image, and the first color is different from the second color.

Optionally, a plurality of congruent rectangular alignment boxes in the second color arranged in a matrix are further displayed on the test image, wherein the plurality of rectangular alignment boxes include a center alignment box having a common symmetry axis with a rectangular boundary of the test image, and an edge alignment box having a common border with the test image; and a superimposition image is displayed on the image acquired by the image acquisition component, wherein the superimposition image includes a rectangular box in a third color and diagonal lines in the third color of the rectangular box, a boundary shape of the rectangular box being congruent with that of the rectangular alignment box, an intersection of the diagonal lines being the center point of the imaging area, and borders of the rectangular box being parallel to borders of the imaging area.

Optionally, the wearable device is a virtual reality device, an augmented reality device, or a mixed reality device.

In summary, in the method for testing the wearable device according to the embodiments of the present disclosure, an angle variation value corresponding to the relative movement of an image acquisition component is acquired by changing the position of the center point of an imaging area of the image acquisition component in a target virtual image, and an optical imaging parameter value of the target virtual image displayed by a wearable device is acquired on the basis of the angle variation value. Since the optical imaging parameter value is acquired by means of machine measurement, the current problem that an optical imaging parameter value of a target virtual image is subjective and less accurate due to the optical imaging parameter value estimated by means of human eyes is solved, and the finally acquired optical imaging parameter value is more objective and more accurate than that acquired by means of the human eyes.

A person skilled in the art may clearly understand that for the sake of convenience and conciseness in description, the specific work processes of the above systems, devices and units may make reference to corresponding processes in the above method embodiments and are not further described herein.

In the present disclosure, the terms such as "first", "second", "third" and "fourth" are merely for a descriptive purpose, and cannot be understood as indicating or implying relative importance. The term "a plurality of" means two or more in number, unless otherwise defined.

In several embodiments provided in the present disclosure, it should be understood that the disclosed devices and methods may be implemented by other means. For example, the device embodiments described above are merely schematic. For example, the partitioning of the units may be a logical functional partitioning. There may be other partitioning modes during actual implementation. For example, multiple units or components may be combined or integrated into another system, or some features may be ignored or not executed. In addition, mutual coupling or direct coupling or communication connection that is shown or discussed may be indirect coupling or communication connection through some interfaces, devices or units, and may be in electrical, mechanical, or other forms.

The units described as separated components may be or may not be physically separated. The components displayed as units may be or may not be physical units, that is, the component may be located in one place or may be distributed on a plurality of network units. Part or all of the units may be selected according to actual needs to achieve the purposes of the solutions of the embodiments.

Persons of ordinary skill in the art may understand that all or part of the steps described in the above embodiments may be completed through hardware, or through relevant hardware instructed by applications stored in a non-transitory computer readable storage medium, such as a read-only memory, a disk, a CD, or the like.

Described above are merely exemplary embodiments of the present disclosure, and are not intended to limit the present disclosure. Within the spirit and principles of the disclosure, any modifications, equivalent substitutions, improvements, or the like are within the protection scope of the present disclosure.

What is claimed is:

1. A method for testing a wearable device, applicable to a controller, the method comprising:
    repeatedly performing an angle acquisition process by using different parameters, the angle acquisition process comprising:
        adjusting a center point of an imaging area of an image acquisition component from a position aligned with an initial point of a target virtual image to a position aligned with a target point of the target virtual image, wherein the target virtual image is a virtual image formed, via a lens component, by a test image displayed by a display screen in the wearable device, and a line connecting the center point of the imaging area and the initial point is perpendicular to the display screen when the center point of the imaging area is aligned with the initial point, and
        acquiring an angle variation value of the center point of the imaging area of the image acquisition component in the adjustment from the position aligned with the initial point of the target virtual image to the position aligned with the target point of the target virtual image; and
    acquiring an optical imaging parameter value of the target virtual image on the basis of the angle variation values acquired in at least two angle acquisition processes.

2. The method according to claim 1, wherein
borders of the test image define a rectangle, and the optical imaging parameter value comprises a virtual image distance of the target virtual image; and
repeatedly performing an angle acquisition process by using different parameters comprises:
respectively performing the angle acquisition process for n times to acquire n first angle variation values, by setting a distance between the image acquisition component and the wearable device as a first capture distance, taking a center point of the target virtual image as the initial point, and taking a center point of n borders of the target virtual image as the target point, 1≤n≤4; and
respectively performing the angle acquisition process for n times to acquire n second angle variation values, by setting the distance between the image acquisition component and the wearable device as a second capture distance, taking the center point of the target virtual image as the initial point, and taking the center point of the n borders of the target virtual image as the target point.

3. The method according to claim 2, wherein acquiring the optical imaging parameter value of the target virtual image on the basis of the angle variation values acquired in the at least two angle acquisition processes comprises:
calculating distance variation values corresponding to n target points on the basis of the n first angle variation values and the n second angle variation values, wherein a distance variation value $d_i$ corresponding to an $i^{th}$ target point satisfies the following equation:

$$d_i = \frac{t1 \times \tan \varphi i1 - t2 \times \tan \varphi i2}{\tan \varphi i1 - \tan \varphi i2},$$

wherein 1≤i≤n, t1 is the first capture distance, t2 is the second capture distance, φi1 is the angle variation value of the center point of the imaging area in the adjustment from the position aligned with the initial point of the target virtual image to the position aligned with the $i^{th}$ target point when the distance between the image acquisition component and the wearable device is the first capture distance, and φi2 is the angle variation value of the center point of the imaging area in the adjustment from the position aligned with the initial point of the target virtual image to the position aligned with the $i^{th}$ target point when the distance between the image acquisition component and the wearable device is the second capture distance; and
acquiring an absolute value of an average value of the distance variation values corresponding to the n target points as the virtual image distance of the target virtual image.

4. The method according to claim 3, wherein n=4; and
the n target points are respectively a center point of a left border of the target virtual image, a center point of a right border of the target virtual image, a center point of an upper border of the target virtual image, and a center point of a lower border of the target virtual image.

5. The method according to claim 4, wherein
the optical imaging parameter value further comprises a distortion amount of the target virtual image; and
acquiring the optical imaging parameter value of the target virtual image on the basis of the angle variation values acquired in the at least two angle acquisition processes comprises:
acquiring the distortion amount of the target virtual image according to the distance variation values corresponding to four target points, four fifth angle variation values and a third capture distance of the image acquisition component corresponding to the four fifth angle variation values, the fifth angle variation value being the first angle variation value or the second angle variation value.

6. The method according to claim 5, wherein acquiring the distortion amount of the target virtual image according to the distance variation values corresponding to the four target points, the four fifth angle variation values and the third capture distance of the image acquisition component corresponding to the four fifth angle variation values comprises:
calculating a distortion width $w_3$ of the target virtual image on the basis of a third capture distance t3, fifth angle variation values $\theta_{left}$ and $\theta_{right}$ of which an angle variation direction is parallel to the width direction of the target virtual image in the four fifth angle variation values and corresponding distance variation values $d_{left}$ and $d_{right}$;
calculating a distortion height $h_3$ of the target virtual image on the basis of the third capture distance t3, fifth angle variation values $\theta_{upper}$ and $\theta_{lower}$ of which an angle variation direction is parallel to the height direction of the target virtual image in the four fifth angle variation values and corresponding distance variation values $d_{upper}$ and $d_{lower}$;
acquiring a width distortion amount $D_w$ of the target virtual image according to the distortion width $w_3$ and the width of the target virtual image; and
acquiring a height distortion amount $D_h$ of the target virtual image according to the distortion height $h_3$ and the height of the target virtual image;
wherein optionally, the distortion width $w_3$ and the distortion height $h_3$ satisfy the following equations:

$$w_3 = (d_{left} + t3) \times \tan \theta_{left} + (d_{right} + t3) \times \tan \theta_{right},$$

$$h_3 = (d_{upper} + t3) \times \tan \theta_{upper} + (d_{lower} + t3) \times \tan \theta_{lower}.$$

7. The method according to claim 6, wherein
acquiring the width distortion amount $D_w$ of the target virtual image according to the distortion width $w_3$ and the width of the target virtual image comprises:
calculating absolute values of differences between the distortion width $w_3$ and the respective widths of the target virtual image acquired in p tests to acquire absolute values of p width differences, p being an integer greater than or equal to 1; and
acquiring a percentage of an average value of the absolute values of p width differences in the distortion width $w_3$ as the width distortion amount $D_w$ of the target virtual image; and
acquiring the height distortion amount $D_h$ of the target virtual image according to the distortion height $h_3$ and the height of the target virtual image comprises:
calculating absolute values of differences between the distortion height $h_3$ and the respective heights of the target virtual image acquired in p tests to acquire absolute values of p height differences; and acquiring a percentage of an average value of the absolute values of p height differences in the distortion height $h_3$ as the height distortion amount $D_h$ of the target virtual image.

8. The method according to claim 1, wherein
the display screen displays the test image in full screen, borders of the test image define a rectangle, and the optical imaging parameter value comprises a size of the target virtual image; and
repeatedly performing an angle acquisition process by using different parameters comprises:
taking m different first vertexes of the target virtual image as the initial point, $1 \leq m \leq 4$; and
for each first vertex in the m first vertexes, taking two second vertexes adjacent to the first vertex in the target virtual image as the target point and respectively performing two angle acquisition processes to acquire two third angle variation values corresponding to the first vertex.

9. The method according to claim 8, wherein the size of the target virtual image comprises a diagonal length of the target virtual image; and
acquiring the optical imaging parameter value of the target virtual image on the basis of the angle variation values acquired in the at least two angle acquisition processes comprises:
calculating a width and a height of the target virtual image on the basis of 2m third angle variation values corresponding to the m first vertexes; and
calculating the diagonal length of the target virtual image on the basis of the width and the height of the target virtual image.

10. The method according to claim 9, wherein calculating the width and the height of the target virtual image on the basis of the 2m third angle variation values corresponding to the m first vertexes comprises:
calculating widths of m target virtual images on the basis of the third angle variation value of which an angle variation direction is parallel to a width direction of the target virtual image in the 2m third angle variation values;
calculating heights of m target virtual images on the basis of the third angle variation value of which the angle variation direction is parallel to a height direction of the target virtual image in the 2m third angle variation values;
wherein a width $w_k$ of the target virtual image corresponding to a $k^{th}$ first vertex and a height $h_k$ of the target virtual image corresponding to the $k^{th}$ first vertex satisfy the following equations:

$$w_k = |(t+d) \times \tan \beta_k|,$$

$$h_k = |(t+d) \times \tan \alpha_k|;$$

wherein $1 \leq k \leq m$, d is a virtual image distance of the target virtual image, t is a capture distance of the image acquisition component, $\beta_k$ is the third angle variation value of which the angle variation direction is parallel to the width direction of the target virtual image in the two third angle variation values corresponding to the $k^{th}$ first vertex, $\alpha_k$ is the third angle variation value of which the angle variation direction is parallel to the height direction of the target virtual image in the two third angle variation values corresponding to the $k^{th}$ first vertex;

taking an average value of the widths of the m target virtual images as the width of the target virtual image; and
taking an average value of the heights of the m target virtual image as the height of the target virtual image;
wherein optionally, m=2; and the m first vertexes are located on a same diagonal of the target virtual image.

11. The method according to claim 1, wherein
borders of the test image define a rectangle, and the optical imaging parameter value comprises a visual angle of the target virtual image; and
repeatedly performing an angle acquisition process by using different parameters comprises:
performing the angle acquisition process for four times to acquire four fourth angle variation values, by taking the center point of the four borders of the target virtual image as the initial point, and taking a border vanishing point of the border on which each initial point is located as the target point of the each initial point.

12. The method according to claim 11, wherein acquiring the optical imaging parameter value of the target virtual image on the basis of the angle variation values acquired in the at least two angle acquisition processes comprises:
calculating a horizontal visual angle $\lambda_{horizontal}$ of the target virtual image on the basis of fourth angle variation values $\lambda_{left}$ and $\lambda_{right}$ parallel to the width direction of the target virtual image in the four fourth angle variation values; and
calculating a vertical visual angle $\lambda_{vertical}$ of the target virtual image on the basis of fourth angle variation values $\lambda_{upper}$ and $\lambda_{lower}$ parallel to the height direction of the target virtual image in the four fourth angle variation values;
wherein $\lambda_{horizontal}$ and $\lambda_{vertical}$ respectively satisfy the following equation:

$$\lambda_{horizontal} = \lambda_{left} + \lambda_{right},$$

$$\lambda_{vertical} = \lambda_{upper} + \lambda_{lower}.$$

13. The method according to claim 1, wherein adjusting the center point of the imaging area of the image acquisition component from the position aligned with the initial point of the target virtual image to the position aligned with the target point of the target virtual image comprises:
fixing the wearable device and swinging the image acquisition component to adjust the center point of the imaging area from the position aligned with the initial point to the position aligned with the target point; or
fixing the image acquisition component and rotating the wearable device to adjust the center point of the imaging area from the position aligned with the initial point to the position aligned with the target point.

14. The method according to claim 1, wherein when the initial point is not the center point of the target virtual image, the angle acquisition process further comprises:
before adjusting the center point of the imaging area of the image acquisition component from the position aligned with the initial point of the target virtual image to the position aligned with the target point of the target virtual image, aligning the center point of the imaging area with the center point of the target virtual image, the line connecting the center point of the imaging area and the initial point being perpendicular to the display screen; and
translating the center point of the imaging area to the initial point.

15. The method according to claim 1, wherein the test image is a rectangular image with a first color as a base and a second color as a border, two perpendicularly intersected symmetry axes in the second color being displayed on the test image, and the first color being different from the second color;

wherein optionally, a plurality of alignment boxes in the second color arranged in a matrix are further displayed on the test image, the plurality of alignment boxes comprising a center alignment box having a common symmetry axis with a rectangular boundary of the test image, and a plurality of edge alignment boxes respectively surrounding at least one of a vertex and a border center point of the test image, and an entire boundary of each edge alignment box being congruent to a part of a boundary of the center alignment box; and a superimposition image is displayed on the image acquired by the image acquisition component, the superimposition image comprising a superimposition alignment box in a third color and diagonal lines in the third color of the superimposition alignment box, a boundary shape of the superimposition alignment box being similar to that of the center alignment box, and an intersection of the diagonal lines being the center point of the imaging area.

16. A non-transitory computer-readable storage medium storing at least one instruction therein; wherein when the at least one instruction is executed by a processing component, the processing component is enabled to perform the method for testing the wearable device as defined in claim 1.

17. A system for testing a wearable device, comprising:
a controller and an image acquisition component;
wherein the controller is configured to:
repeatedly perform an angle acquisition process by using different parameters, the angle acquisition process comprising:
adjusting a center point of an imaging area of an image acquisition component from a position aligned with an initial point of a target virtual image to a position aligned with a target point of the target virtual image, wherein the target virtual image is a virtual image formed, via a lens component, by an actual test image displayed by a display screen in the wearable device, and a line connecting the center point of the imaging area and the initial point is perpendicular to the display screen when the center point of the imaging area is aligned with the initial point, and
acquiring an angle variation value of the center point of the imaging area of the image acquisition component in the adjustment from the position aligned with the initial point of the target virtual image to the position aligned with the target point of the target virtual image; and
acquire an optical imaging parameter value of the target virtual image on the basis of the angle variation values acquired in at least two angle acquisition processes.

18. The system according to claim 17, further comprising at least one of a first combined structure and a second combined structure; wherein the first combined structure comprises: a base, a support post, and a test carrier, wherein one end of the support post is rotatably connected to the base, and the other end of the support post is fixedly connected to the test carrier, wherein the test carrier is configured to receive the wearable device, and the controller is configured to control the support post to rotate on the base; and/or the second combined structure comprises: a support frame and a rotation structure, wherein one end of the rotation structure is rotatably connected to the support frame, and the other end of the rotation structure is fixedly connected to the image acquisition component, wherein the controller is configured to control the rotation structure to rotate on the support frame.

19. The system according to claim 17, wherein the wearable device is a virtual reality device, an augmented reality device, or a mixed reality device.

20. A device for use in testing a wearable device, comprising:
a processor; and
a memory for storing at least one executable instructions of the processor;
wherein the processor is configured to execute the at least one executable instruction to perform a method for testing the wearable device, the method comprising:
repeatedly performing an angle acquisition process by using different parameters, the angle acquisition process comprising:
adjusting a center point of an imaging area of an image acquisition component from a position aligned with an initial point of a target virtual image to a position aligned with a target point of the target virtual image, wherein the target virtual image is a virtual image formed, via a lens component, by a test image displayed by a display screen in the wearable device, and a line connecting the center point of the imaging area and the initial point is perpendicular to the display screen when the center point of the imaging area is aligned with the initial point, and
acquiring an angle variation value of the center point of the imaging area of the image acquisition component in the adjustment from the position aligned with the initial point of the target virtual image to the position aligned with the target point of the target virtual image; and
acquiring an optical imaging parameter value of the target virtual image on the basis of the angle variation values acquired in at least two angle acquisition processes.

* * * * *